(12) United States Patent
Kim et al.

(10) Patent No.: US 9,282,552 B2
(45) Date of Patent: Mar. 8, 2016

(54) METHOD FOR TRANSMITTING AND RECEIVING CONTROL INFORMATION IN A WIRELESS COMMUNICATION SYSTEM, AND APPARATUS FOR SAME

(75) Inventors: Jinmin Kim, Anyang-si (KR); Seunghee Han, Anyang-si (KR); Hyunwoo Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 126 days.

(21) Appl. No.: 14/118,155

(22) PCT Filed: May 17, 2012

(86) PCT No.: PCT/KR2012/003917
§ 371 (c)(1),
(2), (4) Date: Nov. 15, 2013

(87) PCT Pub. No.: WO2012/157987
PCT Pub. Date: Nov. 22, 2012

(65) Prior Publication Data
US 2014/0105150 A1 Apr. 17, 2014

Related U.S. Application Data

(60) Provisional application No. 61/486,781, filed on May 17, 2011, provisional application No. 61/488,158, filed on May 20, 2011, provisional application No. 61/488,176, filed on May 20, 2011.

(51) Int. Cl.
| | |
|---|---|
| *H04W 4/00* | (2009.01) |
| *H04L 12/26* | (2006.01) |
| *H04B 7/216* | (2006.01) |
| *H04W 24/00* | (2009.01) |
| *H04W 72/04* | (2009.01) |
| *H04L 1/00* | (2006.01) |

(Continued)

(52) U.S. Cl.
CPC .......... *H04W 72/042* (2013.01); *H04B 7/0417* (2013.01); *H04L 1/0026* (2013.01); *H04L 1/0041* (2013.01); *H04L 1/0067* (2013.01); *H04L 1/0068* (2013.01); *H04L 1/1671* (2013.01); *H04L 5/001* (2013.01); *H04L 5/0023* (2013.01); *H04L 5/0039* (2013.01); *H04L 5/0044* (2013.01); *H04L 5/0053* (2013.01); *H04L 25/03898* (2013.01);
(Continued)

(58) Field of Classification Search
USPC ......................................... 370/329, 241, 335
See application file for complete search history.

(56) References Cited

U.S. PATENT DOCUMENTS

| | | | |
|---|---|---|---|
| 2005/0195769 A1* | 9/2005 | Kaewell et al. ................ | 370/335 |
| 2010/0046461 A1* | 2/2010 | Wennstrom ................... | 370/329 |

(Continued)

FOREIGN PATENT DOCUMENTS

| | | |
|---|---|---|
| KR | 10-2010-0086920 A | 8/2010 |
| WO | 2010016698 A2 | 2/2010 |
| WO | 2011010855 A2 | 1/2011 |

*Primary Examiner* — Kiet Tang
(74) *Attorney, Agent, or Firm* — Dentons US LLP

(57) ABSTRACT

Disclosed are a method for transmitting and receiving control information in a wireless communication system, and an apparatus for same. A method for transmitting control information by a base station in a wireless communication system according to the present invention comprises the steps of: performing a precoding process by applying different precoding matrix indices to control information for each terminal among predetermined precoding matrices; and transmitting, to each terminal, the precoded control information to which different precoding matrix indices are applied for each terminal, wherein said control information is multiplexed and transmitted via a plurality of antennas.

12 Claims, 20 Drawing Sheets

(51) Int. Cl.
  *H04L 25/03* (2006.01)
  *H04L 5/00* (2006.01)
  *H04B 7/04* (2006.01)
  *H04L 1/16* (2006.01)
  *H04B 7/06* (2006.01)
(52) U.S. Cl.
  CPC ............ *H04B 7/0617* (2013.01); *H04L 1/0046* (2013.01); *H04L 25/03942* (2013.01)

(56) References Cited

U.S. PATENT DOCUMENTS

| | | | |
|---|---|---|---|
| 2010/0165847 A1* | 7/2010 | Kamuf et al. | 370/241 |
| 2010/0208680 A1* | 8/2010 | Nam et al. | 370/329 |
| 2010/0311437 A1* | 12/2010 | Palanki et al. | 455/456.1 |
| 2011/0141988 A1* | 6/2011 | Park et al. | 370/329 |
| 2013/0089078 A1* | 4/2013 | Liu et al. | 370/335 |

* cited by examiner

FIG. 5
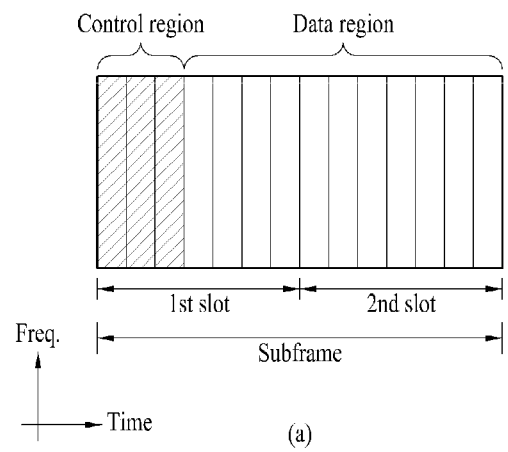
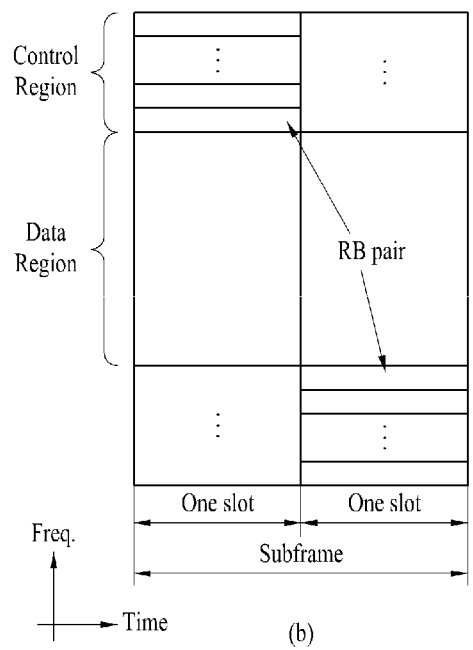

FIG. 6
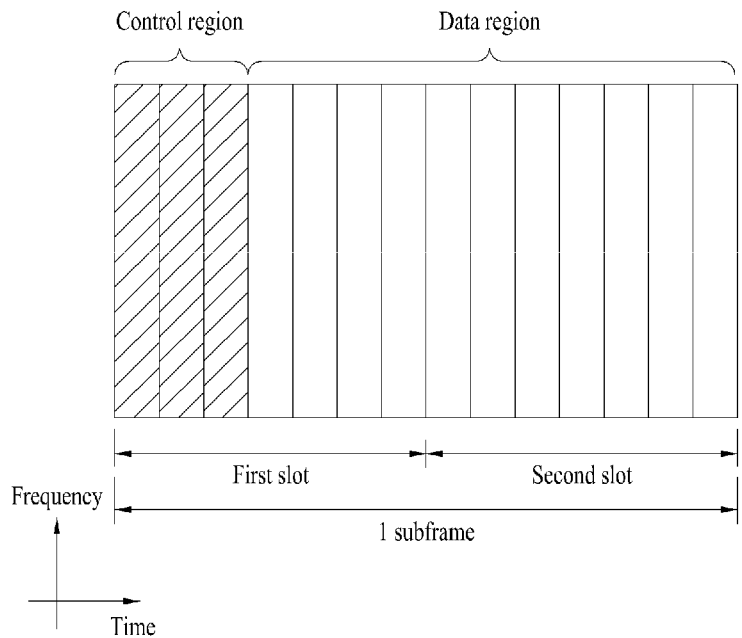
FIG. 7
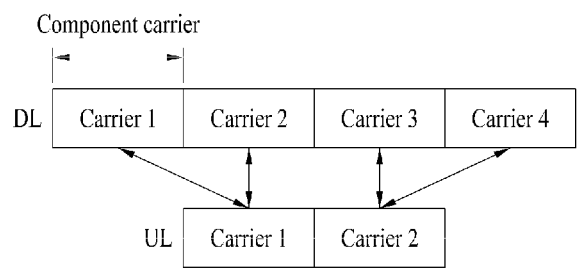
(a)
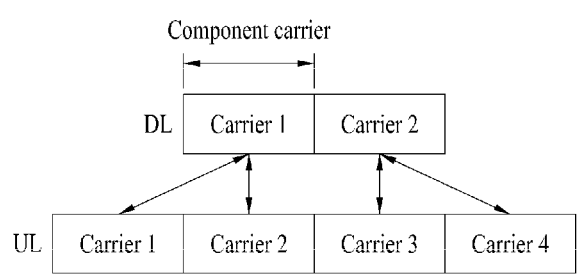
(b)

METHOD FOR TRANSMITTING AND RECEIVING CONTROL INFORMATION IN A WIRELESS COMMUNICATION SYSTEM, AND APPARATUS FOR SAME

This Application is a 35 U.S.C. §371 National Stage Entry of International Application No. PCT/KR2012/003917, filed May 17, 2012 and claims the benefit of U.S. Provisional Application Nos. 61/488,158, filed May 20, 2011, 61/486,781, filed May 17, 2011 and 61/488,176, filed May 20, 2011, all of which are incorporated by reference in their entirety herein.

TECHNICAL FIELD

The present invention relates to wireless communication, and more specifically, to a method for transmitting and receiving control information and an apparatus for the same.

BACKGROUND ART

3GPP LTE (3rd generation partnership project long term evolution) and LTE-A (LTE-advanced) will now be described as an exemplary mobile communication system to which the present invention is applicable.

FIG. 1 illustrates E-UMTS (evolved universal mobile telecommunication system) as an exemplary mobile communication system.

E-UMTS evolved from UMTS (universal mobile telecommunication system) is currently standardized in 3GPP. E-UMTS may be regarded as an LTE system. For technical specifications of UMTS and E-UMTS, reference can be made to Release 8 and Release 9 of "3rd Generation Partnership Project; Technical Specification Group Radio Access Network".

Referring to FIG. 1, E-UMTS includes a user equipment (UE), a base station (BS) and an access gateway (AG) located at the end of a network (E-UTRAN) and connected to an external network. The BS can simultaneously transmit multiple data streams for multicast service, and/or unicast service.

One or more cells are present in a BS. A cell is set to one of bandwidths of 1.25, 2.5, 5, 10, 15 and 20 MHz and provides downlink or uplink service to a plurality of UEs. Different cells may provide different bandwidths. The BS controls data transmission/reception to/from a plurality of UEs. The BS transmits downlink scheduling information about downlink data to the UE to inform the UE of a time/frequency region in which data will be transmitted, coding, data size, hybrid automatic repeat and request (HARQ) related information, etc. In addition, the BS transmits uplink scheduling information about uplink data to the UE to inform the UE of a time frequency region that can be used by the UE, coding, data size, HARQ related information, etc. An interface for user traffic or control traffic transmission may be used between BSs. A core network (CN) may be composed of a network node for user registration of the AG and UE. The AG manages mobility of the UE for each tracking area (TA) composed of a plurality of cells.

While wireless communication technology has been developed to LTE on the basis of wideband code division multiple access (WCDMA), demands and expectations of users and service providers continuously increase. Furthermore, new wireless access technologies are continuously developed, and thus technical evolution is needed to achieve competitiveness. That is, reduction in cost per bit, service availability increase, flexible use of frequency bands, simple structure and open interface, appropriate power consumption of a UE, etc. are required.

Recently, 3GPP has performed standardization of follow-up technology regarding LTE. This technology is called 'LTE-A' in the specification. LTE and LTE-A differ mainly in terms of system bandwidth and introduction of a relay.

LTE-A is aimed at supporting a wideband of up to 100 MHz. To achieve this, carrier aggregation or bandwidth aggregation that accomplishes a wideband using a plurality of frequency blocks is used.

Carrier aggregation uses a plurality of frequency blocks as a wide logical frequency band in order to use a wider frequency band. The bandwidth of each frequency block can be defined based on the system block bandwidth used in LTE. Each frequency block is transmitted using a component carrier.

Although new control channels are considered for LTE-A, how to design and transmit the control channels has not been researched yet.

DISCLOSURE

Technical Problem

An object of the present invention devised to solve the problem lies in a method for transmitting control information at a BS in a wireless communication system.

Another object of the present invention is to provide a method for receiving control information at a UE in a wireless communication system.

Another object of the present invention is to provide a BS for transmitting control information in a wireless communication system.

Another object of the present invention is to provide a UE for receiving control information in a wireless communication system.

The technical problems solved by the present invention are not limited to the above technical problems and those skilled in the art may understand other technical problems from the following description.

Technical Solution

The object of the present invention can be achieved by providing a method for transmitting control information by a base station in a wireless communication system, the method including: performing a precoding process by applying different precoding matrix indices to control information per each UE from among predetermined precoding matrices; and transmitting, to each UE, the precoded control information to which different precoding matrix indices are applied for each UE, wherein the control information is multiplexed and transmitted via a plurality of antennas. The control information may be transmitted through an enhanced PDCCH (ePDCCH) or a beamformed PDCCH (bfPDCCH) and the control information may correspond to a downlink control information (DCI) format. The method may further include categorizing the control information per UE according to whether the control information is a DL grant or a UL grant or whether the control information is transmitted through a common search space or a UE-specific search space and mapping the control information to a layer. The control information per UE may be transmitted based on a cell-specific reference signal (CRS) or a demodulation reference signal (DM RS). The method may further include transmitting the precoding matrix information applied per UE to each UE when the control information per UE is transmitted based on the CRS. The control information per UE may be frequency-multiplexed in a physical downlink shared channel (PDSCH) region and transmitted.

In another aspect of the present invention, provided herein is a method for transmitting control information by a base station in a wireless communication system, the method including: performing channel coding on codewords allocated based on whether control information is a DL grant or a UL grant or whether the control information is transmitted through a common search space or a UE-specific search space; performing rate matching on the channel-coded codewords; and performing layer mapping on the rate-matched codewords. The method may further include multiplexing and transmitting control information corresponding to the layer-mapped codewords through a plurality of antennas. The rate matching may include zero padding, one padding, cyclic extension, repetition or puncturing of bits of a codeword having a small bit size from among the channel-coded codewords to match the bit size of the codeword to a bit size of a codeword having a maximum bit size.

In another aspect of the present invention, provided herein is a method for receiving control information by a UE in a wireless communication system, the method including: receiving control information to which a precoding matrix index discriminated from a precoding matrix index applied to another UE from among predetermined precoding matrices is applied, wherein the control information is multiplexed and transmitted via a plurality of antennas. The control information may be transmitted based on a CRS or a DM RS. The method may further include receiving, from a base station, precoding matrix information applied to the control information when the control information is transmitted based on the CRS. The method may further include decoding the control information received on the basis of the received precoding matrix information.

In another aspect of the present invention, provided herein is a base station for transmitting control information in a wireless communication system, including: a processor configured to perform a precoding process by applying different precoding matrix indices to control information per UE from among predetermined precoding matrices; and a transmitter configured to transmit, to each UE, the precoded control information to which different precoding matrix indices are applied for each UE, wherein the control information is multiplexed and transmitted via a plurality of antennas.

In another aspect of the present invention, provided herein is a UE for receiving control information in a wireless communication system, including: a receiver configured to receive control information to which a precoding matrix index discriminated from a precoding matrix index applied to another UE from among predetermined precoding matrices is applied, wherein the control information is multiplexed and transmitted via a plurality of antennas.

Advantageous Effects

According to embodiments of the present invention, a PDCCH with high reliability is provided to each UE to achieve efficient cell deployment and improve throughput. In addition, the UE may receive the PDCCH even at a low SNR and thus complexity of UE implementation can be reduced.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 5 illustrates a downlink subframe structure used in 3GPP LTE/LTE-A which is a wireless communication system;

FIG. 6 illustrates an uplink subframe structure used in 3GPP LTE/LTE-A which is a wireless communication system;

FIG. 7 illustrates a carrier aggregation (CA) communication system;

BEST MODE

Figure 1:
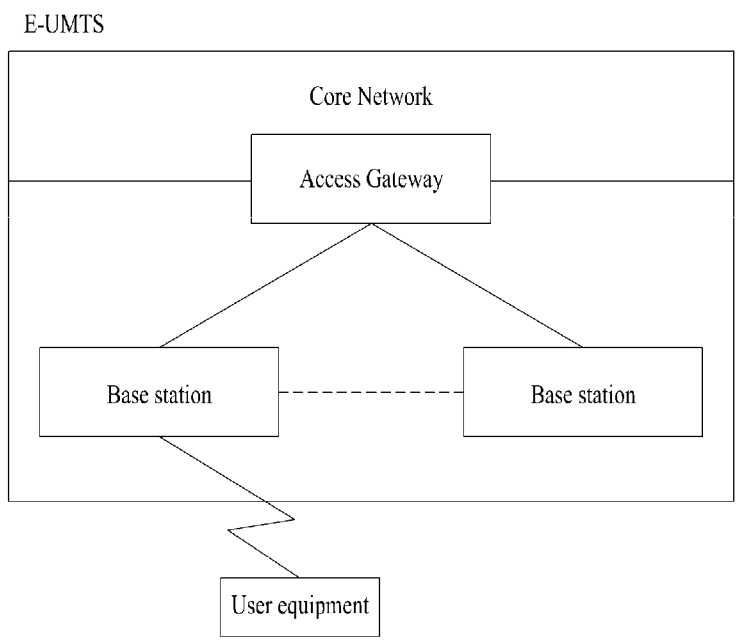
FIG. 1 illustrates E-UMTS as an exemplary mobile communication system.

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that 3GPP LTE and LTE-A mobile communication systems are used. However, the description is applicable to any other mobile communication system except for specific features inherent to the 3GPP LTE and LTE-A systems.

In some instances, known structures and devices are omitted, or are shown in block diagram form focusing on important features of the structures and devices, so as not to obscure the concept of the present invention. The same reference numbers will be used throughout this specification to refer to the same or like parts.

In the following description, a user equipment (UE) is assumed to refer to a mobile or fixed user end device such as a mobile station (MS), an advanced mobile station (AMS), a machine-to-machine (M2M) device, etc. and the term 'base station (BS)' is assumed to refer to any node of a network end, such as a Node B, eNode B, an access point (AP), etc., communicating with a UE.

In a mobile communication system, a UE may receive information from a BS on a downlink and transmit information to the BS on an uplink. The information that the UE transmits or receives includes data and various types of control information. There are many physical channels according to the types and usages of information that the UE transmits or receives.

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as universal terrestrial radio access (UTRA) or CDMA2000. TDMA can be implemented as a radio technology such as global system for mobile communications (GSM)/general packet radio service (GPRS)/enhanced data rates for GSM evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and evolved UTRA (E-UTRA). UTRA is a part of Universal Mobile Telecommunications System (UMTS). $3^{rd}$ Generation Partnership Project (3GPP) Long Term Evolution (LTE) is a part of evolved UMTS (E-UMTS) using E-UTRA, employing OFDMA for downlink and SC-FDMA for uplink. LTE-Advanced (LTE-A) is the next generation of 3GPP LTE.

Figure 2:
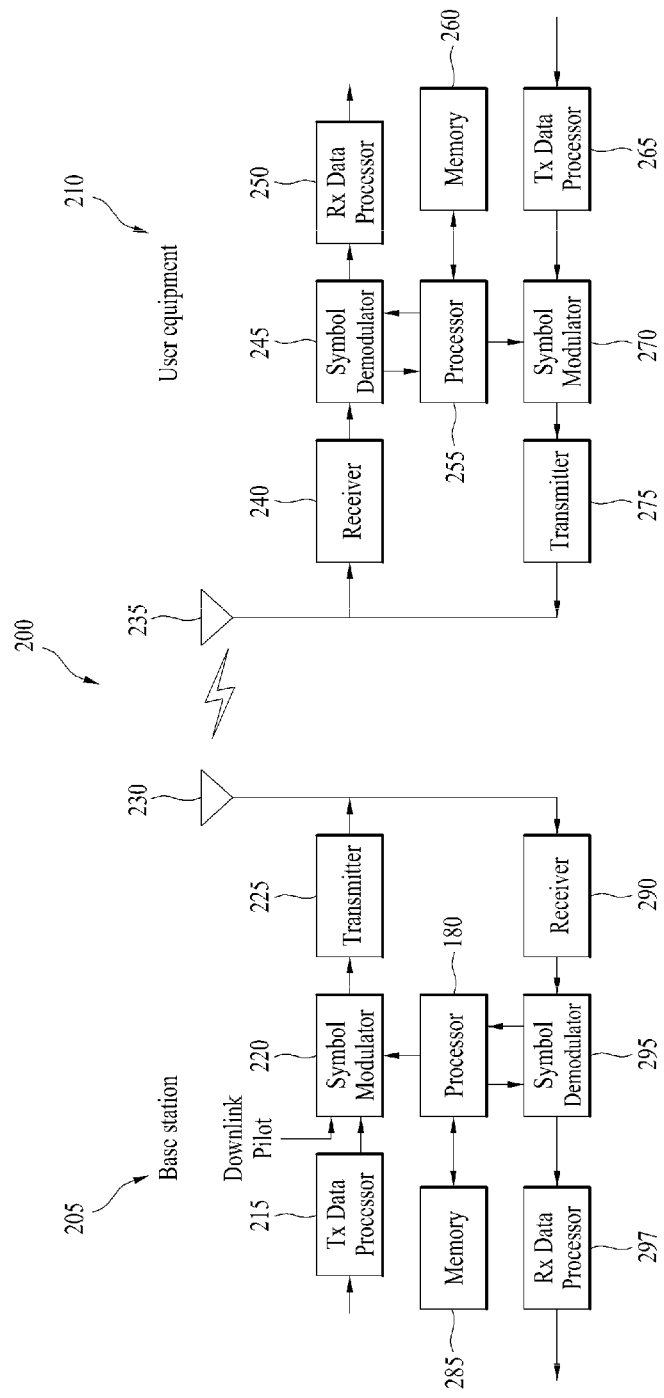
FIG. 2 is a block diagram illustrating configurations of a BS 205 and a UE 210 in a wireless communication system 200.

FIG. 2 is a block diagram illustrating configurations of a BS 205 and a UE 210 in a wireless communication system 200.

While one BS 205 and one UE 210 are shown in FIG. 2 to simplify the configuration of a wireless communication system 200, the wireless communication system 200 may obviously include a plurality of BSs and/or a plurality of UEs.

Referring to FIG. 2, the BS 205 may include a transmission (Tx) data processor 215, a symbol modulator 220, a transmitter 225, a Tx/Rx antenna 230, a processor 280, a memory 285, a receiver 290, a symbol demodulator 295, and an reception (Rx) data processor 297. The UE 210 may include a Tx data processor 265, a symbol modulator 270, a transmitter 275, a Tx/Rx antenna 235, a processor 255, a memory 260, a receiver 240, a symbol demodulator 245, and an Rx data processor 250. While the antennas 230 and 235 are each shown as a single antenna in the BS 205 and the UE 210, the BS 205 and the UE 210 may include multiple antennas. Hence, the BS 205 and the UE 210 support MIMO (Multiple Input Multiple Output). Furthermore, the BS 205 may support both single user-MIMO (SU-MIMO) and/or multi-user-MIMO (MU-MIMO) in the present invention.

On the downlink, the Tx data processor 215 receives traffic data, processes the received traffic data through formatting, coding, interleaving, and modulation (or symbol mapping), and thus outputs modulated symbols ("data symbols"). The symbol modulator 220 processes the data symbols received from the Tx data processor 215 and pilot symbols, thus producing a symbol stream.

More specifically, the symbol modulator 220 multiplexes the data symbols and the pilot symbols and transmits the multiplexed symbols to the transmitter 225. Each transmission symbol may be a data symbol, a pilot symbol or a zero signal value. Pilot symbols may be transmitted successively during each symbol period. The pilot symbols may be frequency division multiplexing (FDM) symbols, orthogonal frequency division multiplexing (OFDM) symbols, time division multiplexing (TDM) symbols, or code division multiplexing (CDM) symbols.

The transmitter 225 converts the symbol stream into one or more analog signals and generates a downlink signal suitable for transmission on a radio channel by additionally processing the analog signals (e.g. amplification, filtering, and frequency upconversion). The downlink signal is transmitted to the UE 210 through the antenna 230.

The UE 210 receives the downlink signal from the BS 205 through the antenna 235 and provides the received downlink signal to the receiver 240. The receiver 240 processes the downlink signal, for example, through filtering, amplification and frequency downconversion and converts the processed downlink signal into digital samples. The symbol demodulator 245 demodulates received pilot symbols and outputs the demodulated pilot symbols to the processor 255 for use in channel estimation.

The symbol demodulator 245 receives a frequency response estimate with respect to downlink from the processor 255, acquires data symbol estimates (i.e. estimates of the transmitted data symbols) by demodulating the received data symbols using the frequency response estimate and provides the data symbol estimates to the Rx data processor 250. The Rx data processor 250 demodulates the data symbol estimates (i.e. performs symbol demapping), deinterleaves the demodulated data symbols, and decodes the deinterleaved data symbols, thereby recovering the traffic data transmitted by the BS 205.

The operations of the symbol demodulator 245 and the Rx data processor 250 are complementary to the operations of the symbol modulator 220 and the Tx data processor 215 of the BS 205.

On the uplink, in the UE 210, the Tx data processor 265 outputs data symbols by processing received traffic data. The symbol modulator 270 multiplexes the data symbols received from the Tx data processor 265 with pilot symbols, modulates the multiplexed symbols, and outputs a stream of the symbols to the transmitter 275. The transmitter 275 generates an uplink signal by processing the symbol stream and transmits the uplink signal to the BS 205 through the antenna 235.

The BS 205 receives the uplink signal from the UE 210 through the antenna 230. In the BS 205, the receiver 290 acquires digital samples by processing the uplink signal. The symbol demodulator 295 provides uplink pilot symbol estimates and uplink data symbol estimates by processing the digital samples. The Rx data processor 297 processes the data symbol estimates, thereby recovering the traffic data transmitted by the UE 210.

The processors 255 and 280 control, adjust and manage operations of the UE 210 and the BS 205, respectively. The processors 255 and 280 may be connected respectively to the memories 260 and 285 that store program code and data. The memories 260 and 285 store an operating system, applications, and general files, in connection with the processors 255 and 280.

The processors 255 and 280 may also be called controllers, microcontrollers, microprocessors, or microcomputers. The processors 255 and 280 may be configured in hardware, firmware, software, or a combination thereof. When embodiments of the present invention are implemented using hardware, application specific integrated circuits (ASICs), digital signal processors (DSPs), digital signal processing devices (DSPDs), programmable logic devices (PLDs), or field programmable gate arrays (FPGAs) which are adapted to implement the present invention may be included in the processors 255 and 280.

When the embodiments of the present invention are implemented using firmware or software, the firmware or software may be configured to include a module, a procedure, a function, etc. which performs functions or operations according to the present invention. The firmware or software may be included in the processors 255 and 280, or stored in the memories 260 and 285 and invoked from the memories 260 and 285 by the processors 255 and 280.

The layers of radio interface protocols between a UE/BS and a network may be classified into Layers 1, 2 and 3 (L1, L2 and L3) based on the three lowest layers of the open system interconnection (OSI) model. A physical layer corresponds to L1 and provides an information transmission service on physical channels. A radio resource control (RRC) layer corresponds to L3 and provides radio control resources between the UE and the network. The UE/BS and the network exchange RRC messages through the RRC layer.

Figure 3:
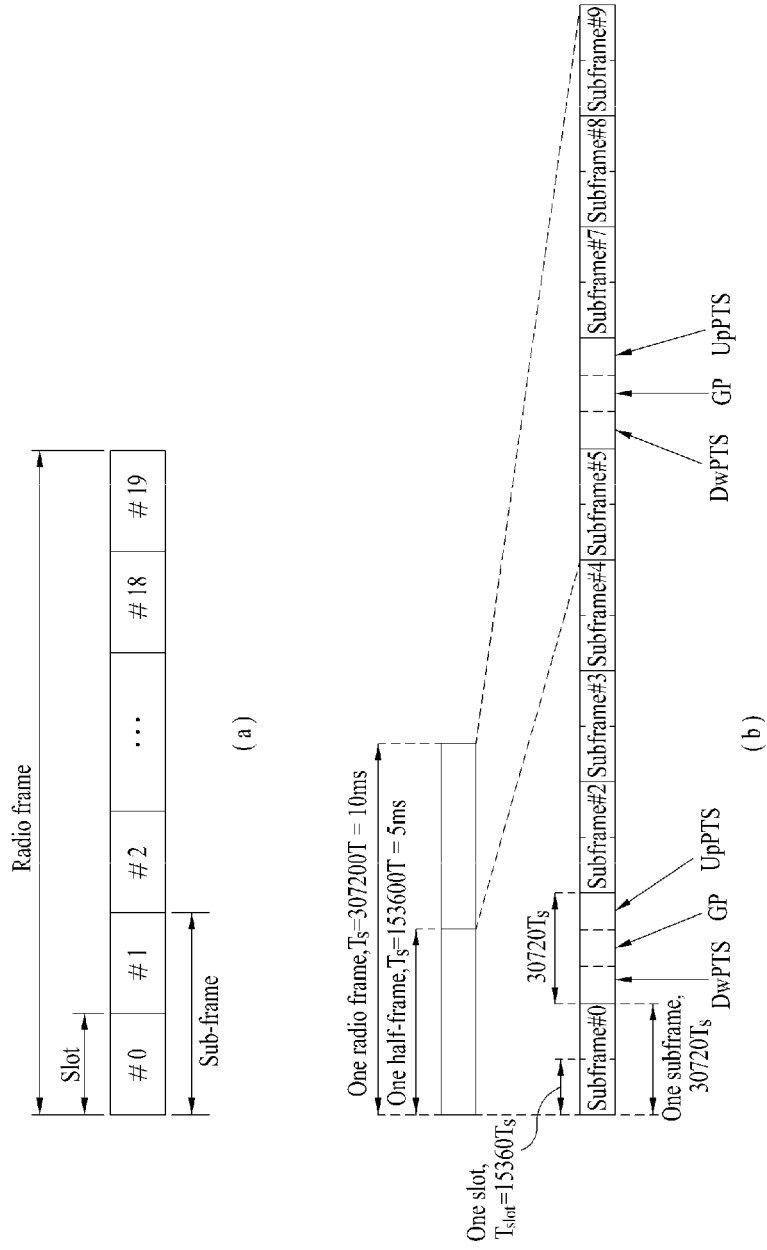
FIG. 3 illustrates radio frame structures used in 3GPP LTE/LTE-A which is a wireless communication system.

FIG. 3 illustrates a radio frame structure used in 3GPP LTE/LTE-A.

In a cellular OFDM wireless packet communication system, UL/DL data packet transmission is performed based on subframes. One subframe is defined as a predetermined interval including a plurality of OFDM symbols. 3GPP LTE standard supports type-1 radio frame applicable to frequency division duplexing (FDD) and type-2 radio frame applicable to time division duplexing (TDD).

FIG. 3(a) illustrates a type-1 radio frame structure. A DL radio frame includes 10 subframes each having 2 slots in the time domain. A time required to transmit one subframe is referred to as a transmission time interval (TTI). For example, one subframe is 1 ms long and one slot is 0.5 ms long. One slot includes a plurality of OFDM symbols in the time domain and a plurality of resource blocks (RBs) in the frequency domain. Since 3GPP LTE uses OFDMA on downlink, an OFDM symbol represents one symbol interval. The OFDM symbol can be called an SC-FDMA symbol or symbol interval. An RB as a resource allocation unit may include a plurality of consecutive subcarriers per slot.

The number of OFDM symbols included per slot may depend on cyclic prefix (CP) configuration. The CP configuration may correspond to an extended CP or a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a physical downlink control channel (PDCCH) and the remaining OFDM symbols can be allocated to a physical downlink shared channel (PDSCH).

FIG. 3(b) illustrates a type-2 radio frame structure. The type-2 radio frame includes 2 half frames. Each half frame includes 5 subframes, a downlink pilot time slot (DwPTS), a guard period (GP), and an uplink pilot time slot (UpPTS), and one subframe consists of 2 slots. The DwPTS is used for initial cell search, synchronization or channel estimation. The UpPTS is used for channel estimation in BS and UL transmission synchronization acquisition in a UE. The GP eliminates UL interference caused by multi-path delay of a DL signal between UL and DL.

The radio frame structure is merely exemplary and the number of subframes included in the radio frame, the number of slots included in a subframe, and the number of symbols included in a slot can vary.

Figure 4:
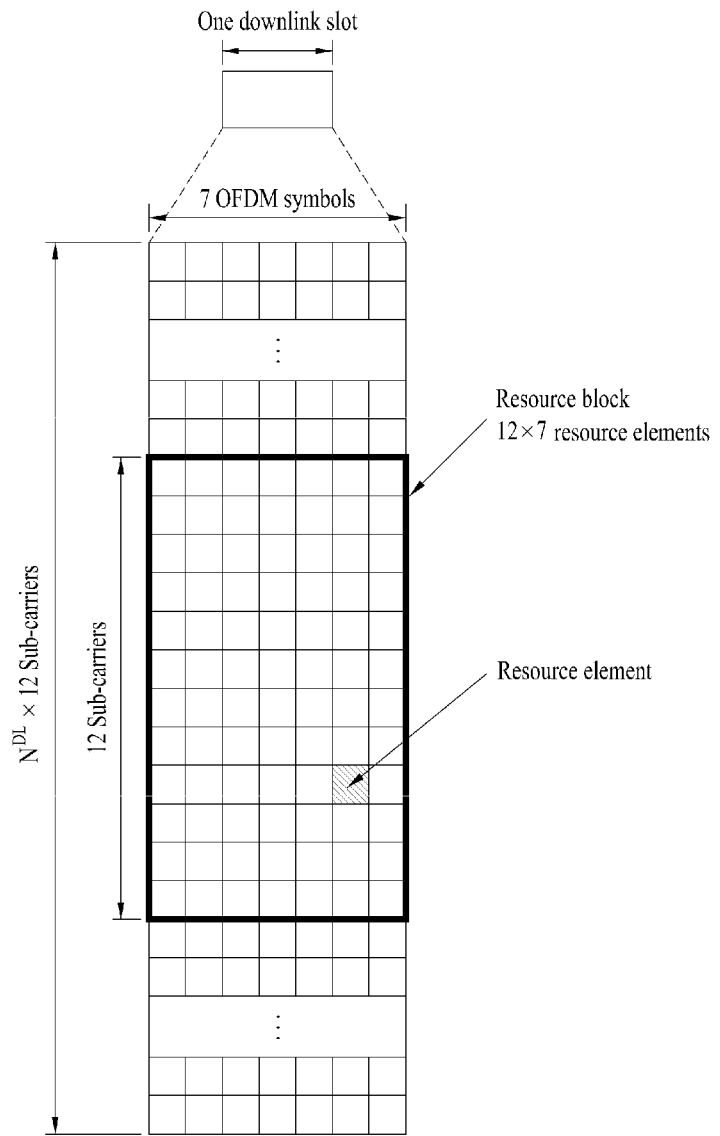
FIG. 4 illustrates a resource grid of a downlink slot in 3GPP LTE/LTE-A which is a wireless communication system.

FIG. 4 illustrates a resource grid of a DL slot in 3GPP LTE/LTE-A.

Referring to FIG. 4, a DL slot includes a plurality of OFDM symbols in the time domain. One DL slot may include 7 (6) OFDM symbols, and a resource block (RB) may include 12 subcarriers in the frequency domain. Each element on the resource grid is referred to as a resource element (RE). One RB includes 12×7 (6) REs. The number of RBs in a DL slot, $N_{RB}$, depends on a DL transmission bandwidth. A UL slot has the same structure as the DL slot and includes SC-FDMA symbols instead of OFDM symbols.

FIG. 5 illustrates a downlink subframe structure of 3GPP LTE/LTE-A.

Referring to FIG. 5, the first three or four OFDM symbols in the first slot of a subframe correspond to a control region to which a control channel is allocated and the remaining OFDM symbols correspond to a data region to which a PDSCH is allocated. Examples of a DL control channel used in LTE include a physical control format indicator channel (PCFICH), a physical downlink control channel (PDCCH), a physical hybrid ARQ indicator channel (PHICH), etc. The PCFICH is transmitted through the first OFDM symbol of a subframe and carries information on the number of OFDM symbols used for control channel transmission in the subframe. The PHICH carries a hybrid automatic repeat request ACK/NACK (HARQ ACK/NACK) signal in response to uplink transmission.

Examples of a DL control channel used in 3GPP LTE include a PCFICH, a PDCCH, PHICH, etc. The PCFICH transmitted through the first OFDM symbol of a subframe carries information on the number of OFDM symbols (i.e. control region size) used for control channel transmission in the subframe. Information transmitted on the PDCCH is referred to as downlink control information (DCI). The DCI includes UL resource allocation information, DL resource allocation information, UL transmit (Tx) power control command for UE groups, etc. That is, an ACK/NACK signal for UL data transmitted by a UE is transmitted on the PHICH.

The PDCCH will now be described in detail.

A BS can transmit transport format and resource allocation information (DL grant) of a PDSCH, resource allocation information (UL grant) of a PUSCH, a set of Tx power control commands with respect to an arbitrary UE and individual UEs in a UE group, activation of a VoIP (voice over Internet protocol), etc. on the PDCCH. A plurality of PDCCHs can be transmitted in a control region. A UE can monitor the plurality of PDCCHs. The PDCCH includes an aggregate of one or several consecutive control channel elements (CCEs). The PDCCH can be transmitted in the control region after sub-block interleaving. A CCE is a logical allocation unit used to provide the PDCCH with a coding rate based on a state of a radio channel. The CCE corresponds to a plurality of resource element groups. A format of the PDCCH and the number of bits of the available PDCCH are determined according to a correlation between the number of CCEs and the coding rate provided by the CCEs.

Control information carried on the PDCCH is called DCI. Table 1 shows DCI according to DCI format.

TABLE 1

| DCI Format | Description |
| --- | --- |
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

DCI format 0 indicates uplink resource allocation information, DCI format 1 to DCI format 2 are used to indicate downlink resource allocation information, and DCI format 3 and DCI format 3A indicate uplink transmit power control (TPC) command for UE groups.

A method of mapping resources by a BS for PDCCH transmission in LTE is described briefly.

In general, the BS can transmit scheduling allocation information and other control information through a PDCCH. A physical control channel may be transmitted through an aggregate of one or more contiguous CCEs. A CCE includes 9 resource element groups (REGs). The number of REGs which are not allocated to a PCFICH or PHICH is represented by $N_{REG}$. CCEs that can be used in the system correspond to 0 to $N_{CCE-1}$ (here, $N_{CCE} = \lfloor N_{REG}/9 \rfloor$). A PDCCH supports multiple formats as shown in the following table 3. A PDCCH composed of n contiguous CCEs starts from a CCE that satisfies i mod n=0 (here, i is a CCE number). Multiple PDCCHs may be transmitted through one subframe.

TABLE 2

| PDCCH format | Number of CCEs | Number of REGs | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

Referring to Table 2, the BS can determine a PDCCH format on the basis of the number of regions in which the BS will transmit control information. A UE can reduce overhead by reading the control information based on a unit of CCE. Similarly, a relay can read the control information based on a unit of relay-CCE (R-CCE). In LTE-A, resource elements (REs) can be mapped based on a unit of R-CCE in order to transmit an R-PDCCH for an arbitrary relay.

Referring to FIG. 4(b), a UL subframe can be divided into a control region and a data region in the frequency domain. The control region is allocated to a physical uplink control channel (PUCCH) carrying UCI, whereas the data region is allocated to a physical uplink shared channel (PUSCH) carrying user data. To maintain single carrier property, a UE does not simultaneously transmit the PUCCH and the PUSCH. A PUCCH for one UE is allocated to an RB pair in one subframe. RBs belonging to an RB pair occupy different subcarriers in 2 slots. The RB pair allocated to the PUCCH is frequency-hopped at a boundary of the slots.

Control information transmitted on a PDCCH is referred to as downlink control information (DCI). DCI format 0 is defined for uplink and DCI formats 1, 1A, 1B, 1C, 1D, 2, 2A, 3 and 3A are defined for downlink. A DCI format selectively includes information such as a hopping flag, RB allocation information, modulation coding scheme (MCS), redundancy version (RV), a new data indicator (NDI), transmit power control (TPC), a cyclic shift demodulation reference signal (DM RS), channel quality indicator (CQI) request, HARQ process number, transmitted precoding matrix indicator (TPMI), precoding matrix indicator (PMI) configuration, etc. according to the purpose thereof.

The PDCCH carries transport format and resource allocation information of a downlink shared channel (DL-SCH), transport format and resource allocation information of an uplink shared channel (UL-SCH), paging information on a paging channel (PCH), system information on the DL-SCH, resource allocation information of a higher-layer control message, such as a random access response transmitted on a PDSCH, a Tx power control command set with respect to individual UEs in a UE group, a Tx power control command, activation of voice over IP (VoIP), etc. A plurality of PDCCHs can be transmitted in the control region. A UE can monitor the plurality of PDCCHs. The PDCCH is transmitted as an aggregate of one or more consecutive control channel elements (CCEs). A CCE is a logical allocation unit used to provide a coding rate based on a radio channel state to the PDCCH. The CCE corresponds to a plurality of resource element groups (REGs). The format of the PDCCH and the number of bits of the PDCCH are determined on the basis of the number of CCEs. A BS determines a PDCCH format according to DCI to be transmitted to a UE and adds cyclic redundancy check (CRC) to control information. The CRC is masked by an identifier (e.g. radio network temporary identifier (RNTI)) according to the owner or purpose of the PDCCH. For example, when the PDCCH is destined for a specific UE, the CRC can be masked by the identifier (e.g. cell-RNTI (C-RNTI)) of the specific UE. When the PDCCH is for a paging message, the CRC can be masked by a paging identifier (e.g. paging-RNTI (P-RNTI)). When the PDCCH is for system information (more specifically, a system information block (SIC)), the CRC can be masked by a System Information RNTI (SI-RNTI). When the PDCCH is for a random access response, the CRC can be masked by a random access RNTI (RA-RNTI).

FIG. 6 illustrates an uplink subframe structure used in 3GPP LTE/LTE-A.

Referring to FIG. 6, an uplink subframe includes a plurality of slots (e.g. two slots). The slots may include different numbers of SC-FDMA symbols according to CP length. The uplink subframe is divided into a data region and a control region in the frequency domain. The data region includes a PUSCH and is used to transmit a data signal such as audio data. The control region includes a PUCCH and is used to transmit UCI. The PUCCH includes RB pairs located on both ends of the data region in the frequency domain and is hopped based on slots.

The PUCCH can be used to transmit the following control information.

- Scheduling request (SR): This is information used to request a UL-SCH resource and is transmitted using On-Off Keying (OOK).
- HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords.
- Channel quality indicator (CQI): This is feedback information about a downlink channel. Feedback information regarding Multiple Input Multiple Output (MIMO) includes a rank indicator (RI), a precoding matrix indicator (PMI), a precoding type indicator (PTI), etc. 20 bits are used per subframe.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports 7 formats according to information transmitted thereon.

Table 3 shows the mapping relationship between PUCCH formats and UCI in LTE.

TABLE 1

| PUCCH format | UCI (Uplink Control Information) |
| --- | --- |
| Format 1 | SR (scheduling request) (non-modulated waveform) |
| Format 1a | 1-bit HARQ ACK/NACK (SR exist/non-exist) |
| Format 1b | 2-bit HARQ ACK/NACK (SR exist/non-exist) |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20 + 1 coded bits) |
| Format 2b | CQI and 2-bit HARQ ACK/NACK (20 + 2 coded bits) |

FIG. 7 illustrates a carrier aggregation (CA) communication system.

To use a wider frequency band, LTE-A employs CA (or bandwidth aggregation) technology which aggregates a plurality of UL/DL frequency blocks to obtain a wider UL/DL bandwidth. Each frequency block is transmitted using a component carrier (CC). The CC can be regarded as a carrier frequency (or center carrier, center frequency) for the frequency block.

CCs may be contiguous or non-contiguous in the frequency domain. Bandwidths of the CCs can be limited to bandwidths of legacy systems for backward compatibility with the legacy systems. For example, 3GPP LTE supports bandwidth of {1.4, 3, 5, 10, 15, 20} MHz and LTE-A can support bandwidths wider than 20 MHz through aggregation of the bandwidths supported by LTE. The bandwidth of a CC can be independently determined. Asymmetrical CA in which the number of UL CCs is different from the number of DL CCs can be implemented. A DL CC/UL CC link can be fixed or semi-statically configured in the system. For example, when there are 4 DL CCs and 2 UL CC as shown in FIG. 6(a), DL-UL linkage in which the DL CCs correspond to the UL CCs in the ratio of 2:1 can be configured. Similarly, when there are 2 DL CCs and 4 UL CC as shown in FIG. 6(b), DL-UL linkage in which the DL CCs correspond to the UL CCs in the ratio of 1:2 can be configured. Symmetrical CA in which the number of UL CCs equals the number of DL CCs can also be implemented. In this case, DL-UL linkage in which DL CCs correspond to UL CCs in the ratio of 1:1 can be configured.

Even if the system bandwidth is configured with N CCs, a frequency band that a specific UE can monitor/receive can be limited to M (<N) CCs. Various parameters with respect to CA can be set cell-specifically, UE-group-specifically, or UE-specifically. Control information may be transmitted/received only through a specific CC. This specific CC can be referred to as a primary CC (PCC) and other CCs can be referred to as secondary CCs (SCCs).

LTE-A uses the concept of a cell in order to manage radio resources. The cell is defined as a combination of DL resources and UL resources. Here, the UL resources are non-essential. Accordingly, the cell can be configured with DL resources only, or DL resources and UL resources. When CA is supported, the linkage between a carrier frequency (or DL CC) of a DL resource and a carrier frequency (or UL CC) of a UL resource can be designated by system information. A cell operating at a primary frequency (or PCC) can be referred to as a primary cell (PCell) and a cell operating at a secondary frequency (or SCC) can be referred to as a secondary cell (SCell).

The PCell is used for a UE to perform an initial connection establishment procedure or a connection re-establishment procedure. The PCell may refer to a cell designated during a handover procedure. The SCell can be configured after RRC connection is established and used to provide additional radio resources. The PCell and the SCell can be called a serving cell. Accordingly, for a UE that does not support CA while in an RRC_connected state, only one serving cell configured with a PCell exists. Conversely, for a UE that is in an RRC_connected state and supports CA, one or more serving cells including a PCell and a SCell are provided. For CA, a network can configure one or more SCells for a UE that supports CA in addition to a PCell initially configured during a connection establishment procedure after an initial security activation procedure.

CA using a plurality of CCs needs a method for effectively managing the CCs, differently from LTE that uses a single carrier. To efficiently manage CCs, the CCs can be categorized according to roles and characteristics thereof. In CA, multiple carriers can be classified into a primary CC (PCC) and a secondary CC (SCC), which may be UE-specific parameters.

The PCC is a center CC in management of multiple CCs and one PCC is defined per UE. The PCC is used for management of all aggregated CCs and SCCs provide additional frequency resources for high throughput. For example, connection (RRC connection) for signaling between a BS and a UE can be achieved through the PCC. Furthermore, security and provision of information for a high layer can be provided through the PCC. When only one CC is present, the CC corresponds to the PCC and executes the same function as that of the carrier of LTE.

A BS can allocate an activated component carrier (ACC) from among a plurality of CCs to a UE. The UE previously knows the ACC allocated thereto through signaling. The UE can aggregate responses to a plurality of PDCCHs received from a downlink PCC and downlink SCCs and transmit the responses through an uplink PCC.

A reference signal in 3GPP-A will now be briefly described.

One important consideration in design of an LTE-A system is backward compatibility. That is, LTE UEs need to operate in LTE-A systems and the LTE-A system needs to support the same. In reference signal transmission, reference signals for a maximum of 8 transmit antenna ports need to be additionally defined in a time-frequency region in which a CRS defined in LTE is transmitted per subframe in the entire bandwidth. In LTE-A, however, when a reference signal pattern for a maximum of 8 transmit antennas is added per subframe to the entire bandwidth as CRS in LTE, reference signal transmission overhead excessively increases. Accordingly, reference signals newly designed in LTE-A are categorized into a channel state information reference signal (CSI-RS) (or channel state indication-RS) for channel measurement for selecting a modulation and coding scheme (MCS) and a precoding matrix index (PMI) and a demodulation RS (DM RS) for demodulation of data transmitted through 8 transmit antennas. The CSI-RS is designed for the purpose of channel measurement, whereas the CRS is used for handover measurement and data demodulation. The CSI-RS may also be used for handover measurement. The CSI-RS need not be transmitted per subframe since the CSI-RS is used to obtain channel state information, differently from the CRS. Accordingly, a BS intermittently transmits the CSI-RS in the time domain to reduce CSI-RS transmission overhead and transmits a dedicated DM RS to a UE scheduled in a corresponding time-frequency region for data demodulation. That is, a DM RS of a specific UE is transmitted only in a region in which the UE is scheduled, that is, a time-frequency region in which data can be received.

In a cellular network based wireless communication system, interference between homogeneous networks or between heterogeneous networks is present. This interference may affect not only a data channel but also a control channel. In LTE/LTE-A, an almost blank subframe (ABS) can be allocated for interference control of a data channel (PDSCH) such that a victim cell can receive an interference-free signal or a frequency region can be orthogonally allocated to each UE located at a cell edge using scheduling information between BSs. However, in the case of control channels (PDCCH, PCFICH and PHICH), they can be transmitted in any subframe and it is difficult to avoid interference because the control channels are allocated to the entire DL bandwidth and transmitted. Accordingly, a method for mitigating or avoiding interference with respect to the control channels is needed.

Figure 8:
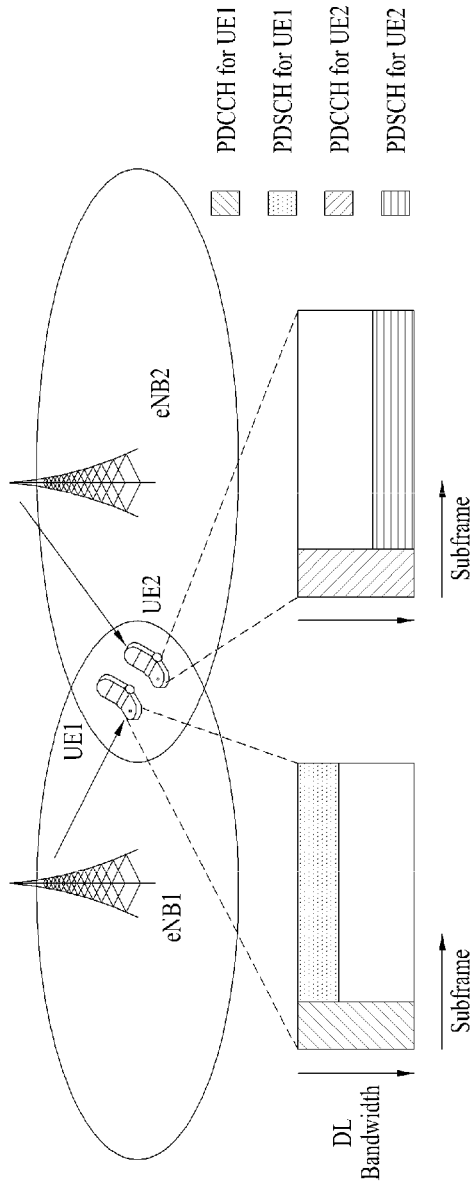
FIG. 8 illustrates a PDSCH interference control scheme using scheduling.

FIG. 8 illustrates a PDSCH interference control method using scheduling.

The method shown in FIG. 8, which can be used when eNB1 and eNB2 exchange scheduling information, allocates PDSCHs to UE1 and UE2 located at a cell boundary in orthogonal frequency regions to mitigate interference. However, PDCCH interference cannot be alleviated because the PDCCH is transmitted in the entire DL bandwidth.

Furthermore, interference is generated when eNB1 and eNB2 have different DL/UL configurations, which is described with reference to FIG. 9.

Figure 9:
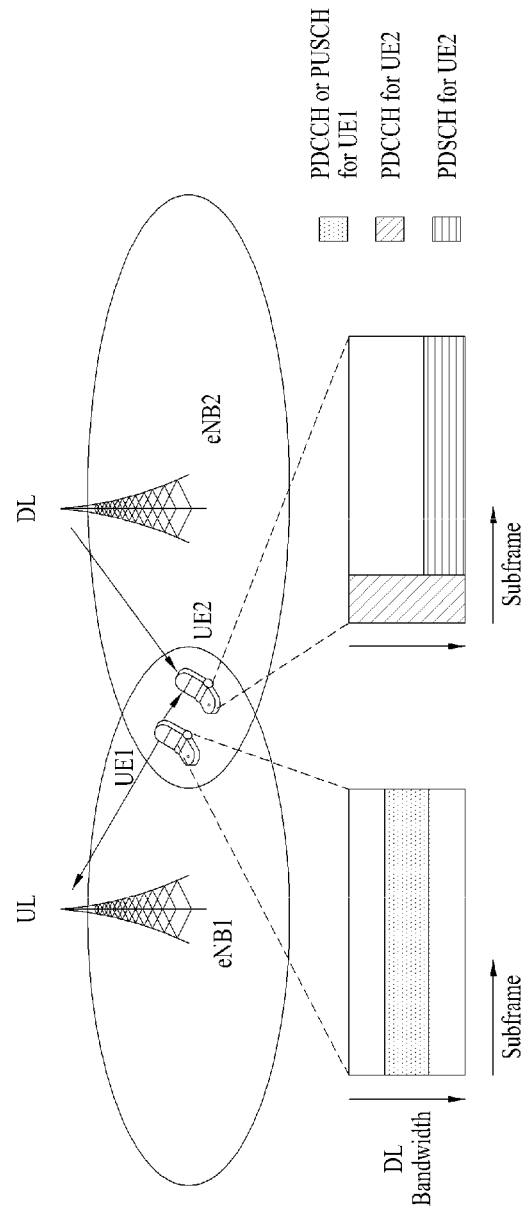
FIG. 9 illustrates interference according to different downlink/uplink configurations of BSs.

FIG. 9 illustrates the influence of interference according to different DL/UL configurations of eNBs.

Referring to FIG. 9, a PUCCH or a PUSCH transmitted by UE1 may act as interference on a PDCCH and a PDSCH that need to be received by neighboring UE2. Even in this case, if scheduling information is exchanged between eNB1 and eNB2, interference on the PDSCH can be avoided by allocating the UEs to orthogonal frequency regions. However, the PDCCH transmitted in the entire DL bandwidth is affected by interference from the PUCCH or PUSCH transmitted by UE1.

To solve the above-described problem, the present invention proposes an enhanced PDCCH transmission scheme and a beamformed PDCCH transmission scheme. Here, an enhanced PDCCH is an enhanced version of the PDCCH in LTE and can be called ePDCCH and transmitted through a PDSCH region in LTE. While a beamformed PDCCH is referred to as a bfPDCCH in the present specification, different terms may be used for the beamformed PDCCH. The bfPDCCH can be transmitted through a PDCCH region in LTE.

In addition, the enhanced PDCCH can include a relay-PDCCH (R-PDCCH) that is a control channel for a relay in the present specification unless otherwise mentioned.

The ePDCCH or bfPDCCH refers to precoding of a PDCCH of a victim cell and transmission of the precoded PDCCH through multiple antennas in order to protect the PDCCH of the victim cell or improve reliability of the PDCCH. To acquire the ePDCCH, a UE can perform scheduling based explicit decoding which is used to receive a PDSCH or carry out blind decoding. Blind decoding refers to an operation of a processor 120 of the UE to decode all CCEs transmitted by a BS and detects a DCI format transmitted to the UE through cyclic redundancy check (CRC) and may include a detection scheme similar to this process.

To obtain the bfPDCCH, the UE can perform decoding or blind decoding. Blind decoding in this case refers to an operation of the processor 120 of the UE to decode all CCEs transmitted by a BS and detects a DCI format transmitted to the UE through cyclic redundancy check (CRC) and may include a detection scheme similar to this process.

A BS can transmit a PDCCH in a PDSCH region according to a PDCCH modulation and coding scheme (MCS) or a PDSCH MCS. Otherwise, the BS may set a new MCS and transmit the PDCCH according to the new MCS. A frequency region (resource block number or index) in which the ePDCCH is transmitted or the index of a subframe through which the ePDCCH is transmitted can be indicated/triggered by the BS to a UE through higher layer signaling or using a PDCCH or can be operated in a fixed manner. However, the present invention proposes a scheme applicable irrespective of whether the frequency region or the subframe index is indicated/triggered or operated in a fixed manner.

Since the BS can precode the ePDCCH and transmit the precoded ePDCCH through a PDSCH region, the BS can perform beamforming transmission (closed loop MIMO transmission) UE-specifically using a cell-specific reference signal (CRS) or UE-specific reference signal (which corresponds to a DMRS). The beamformed ePDCCH can have a higher reception signal-to-noise ratio (SNR) than the PDCCH and UEs can receive DCI formats with high reliability from the ePDCCH.

In addition, the BS can increase reception SNRs of UEs using beamforming for the bfPDCCH and the UEs can receive DCI formats with high reliability from the bfPDCCH.

FIGS. 10*a* to 10*e* illustrate a method of controlling interference using beamforming for an ePDCCH.

Figure 10A:
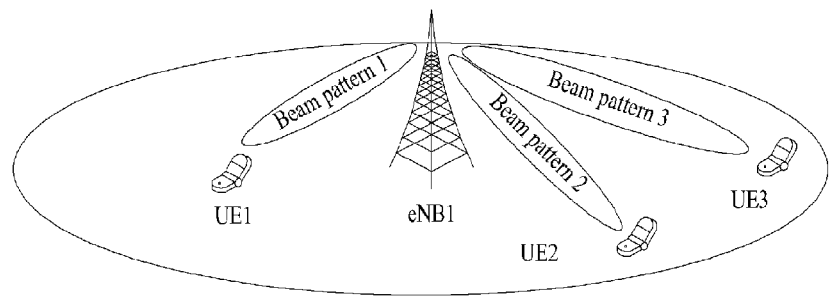
FIGS. 10a to 10e illustrate a method for controlling interference using beamforming for an ePDCCH.
Figure 10B:
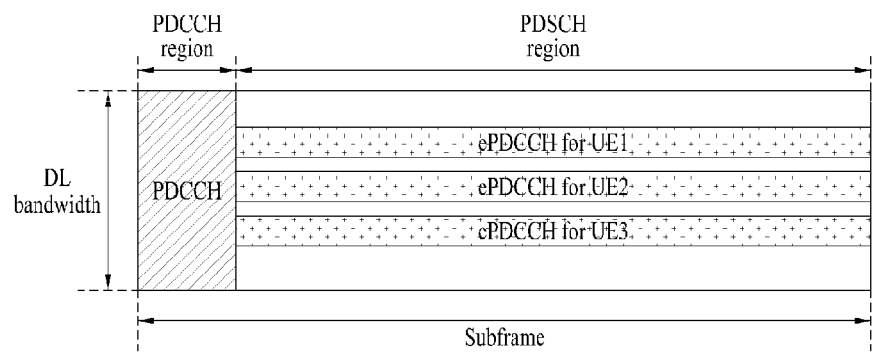

Referring to FIG. 10*a*, eNB1 can increase the reception SNR at each UE and thus control interference by transmitting data using beamforming for UE1, UE2 and UE3. Here, eNB1 can UE-multiplex ePDCCHs for UEs UE1, UE2 and UE3 using one or more RBs and transmit the ePDCCHs, as shown in FIG. 10b. That is, the ePDCCHS for UE1, UE2 and UE3 are frequency-division-multiplexed and transmitted in FIG. 10b.

Figure 10C:
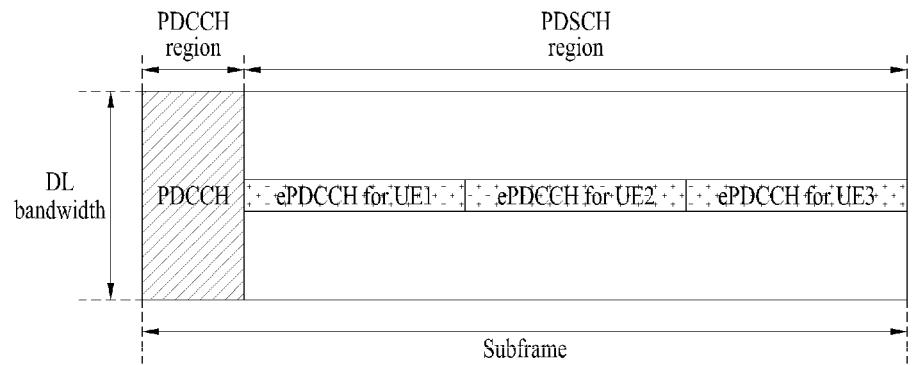

Referring to FIG. 10c, eNB1 can UE-multiplex ePDCCHs for UE1, UE2 and UE3 using an OFDM symbol of the time domain in a fixed number of RBs in the entire DL bandwidth and transmit the ePDCCHs. That is, the ePDCCHs for UE1, UE2 and UE3 can be time-division-multiplexed (TDM) and transmitted in FIG. 10c.

Figure 10D:
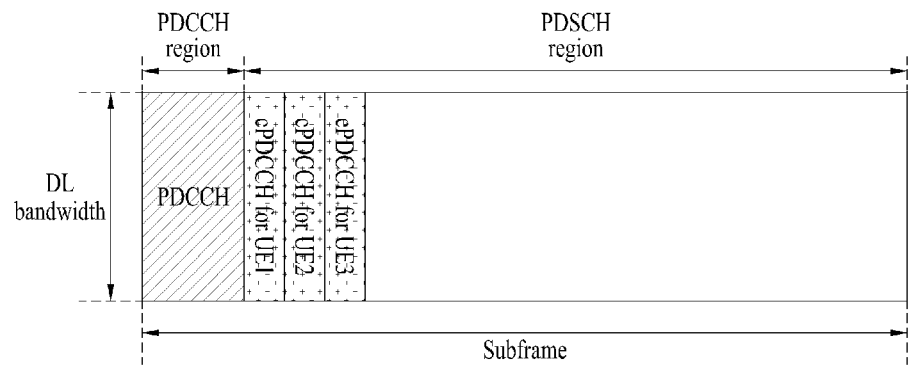

Referring to FIG. 10d, eNB1 can UE-multiplex ePDCCHs for UE1, UE2 and UE3 using one or more OFDM symbols in the entire DL bandwidth and transmit the ePDCCHs. That is, the ePDCCHs for UE1, UE2 and UE3 can be frequency-division-multiplexed (FDM) in a time interval corresponding to one or more OFDM symbols and transmitted in FIG. 10d.

Figure 10E:
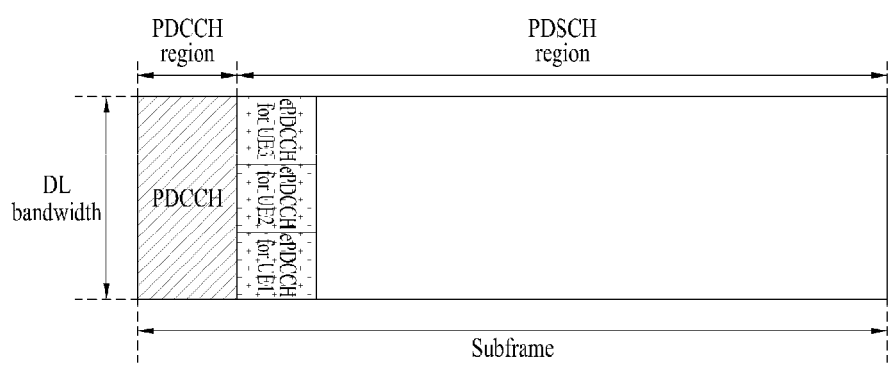

Referring to FIG. 10e, the BS can multiplex ePDCCHs for UE1, UE2 and UE3 based on a unit of RB in the frequency domain within a fixed number of OFDM symbols and transmit the ePDCCHs.

Figure 11A:
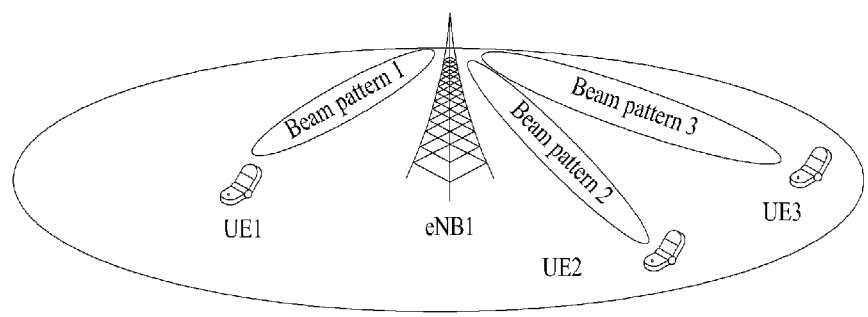
FIGS. 11a and 11b illustrate a method for controlling interference using beamforming for a bfPDCCH.
Figure 11B:
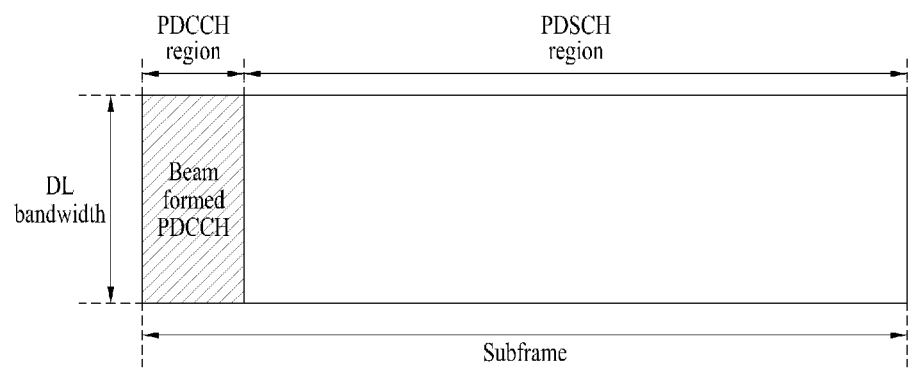

FIGS. 11a and 11b illustrate a method for controlling interference using beamforming for a bfPDCCH.

Referring to FIGS. 11a and 11b, the BS assists in increasing reception SNRs of UEs using beamforming for a bfPDCCH and each UE can receive a DCI format with high reliability through the bfPDCCH. The BS can transmit the bfPDCCH by reusing a PDCCH while maintaining backward compatibility. The bfPDCCH is transmitted through a PDCCH region in LTE.

Figure 12:
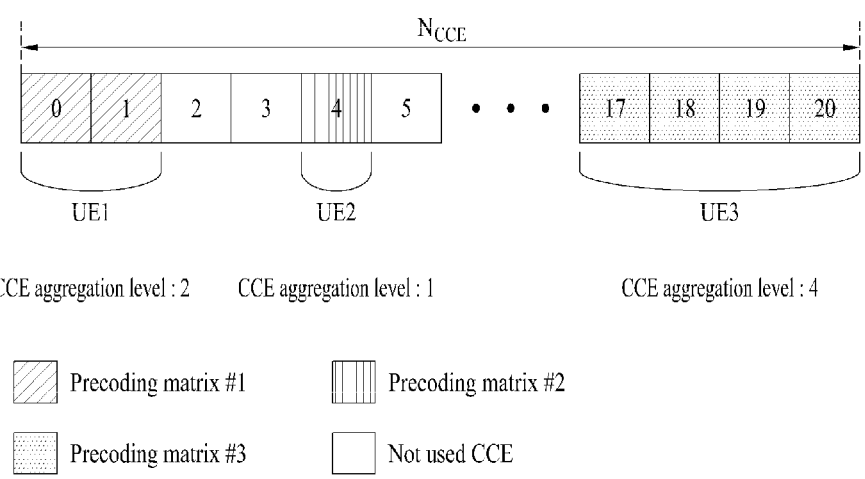
FIG. 12 illustrates precoding UE-specifically performed on an ePDCCH and a bfPDCCH.

FIG. 12 illustrates UE-specific precoding performed on an ePDCCH and a bfPDCCH.

In FIG. 12, the ePDCCH and bfPDCCH may be configured based on a unit of CCE or a unit of RE. FIG. 12 illustrates a case in which DCI formats for three UEs are transmitted at aggregation levels of 2, 1 and 4. Referring to FIG. 12, the BS can respectively transmit the ePDCCH or bfPDCCH to UE1, UE2 and UE3 at aggregation levels 2, 1 and 4, respectively.

In addition, the BS transmits the ePDCCH and/or the bfPDCCH to UE1 in such a manner that CCEs for UE1 are multiplied by precoding matrix #1 for beamforming, and thus UE1 can detect a DCI format with high reliability according to reception SNR gain. Since the BS transmits the ePDCCH and/or the bfPDCCH to UE2 and UE3 in such a manner that CCEs for UE2 and UE3 are respectively multiplied by precoding matrix #2 and precoding matrix #3 for beamforming, UE2 and UE3 can detect DCI formats with high reliability according to reception SNR gain.

The above-described UE-specifically precoded DCI formats are DCI formats oriented to corresponding UEs, and thus the UEs can perform blind decoding on the DCI formats on the assumption that DCI formats transmitted through the ePDCCH and/or the bfPDCCH can be transmitted in a UE-specific search space (space that needs to be UE-specifically searched). When precoding is not performed using a precoded DCI format or precoding is carried out using a precoding matrix that can be known to all UEs in a cell, the BS can transmit DCI formats in a common search space and the UEs in the cell can perform blind decoding on the DCI formats in the common search space.

For ePDCCH and/or bfPDCCH transmission, a layer mapping scheme and a precoding scheme are needed. The present invention proposes a data structure carried on the ePDCCH and/or bfPDCCH, a layer mapping scheme and a precoding scheme for ePDCCH and/or bfPDCCH transmission and procedures for the same.

PDCCH formats can be categorized into DCI format 0 and 4 through which a UL grant is transmitted, DCI formats 1, 1A, 1B, 1C, 1D, 2A, 2B and 2C through which a DL grant is transmitted and DCI formats 3 and 3A through which TPC commands with respect to a PUCCH and a PUSCH are transmitted. DCI formats 3 and 3A are uplink signal related commands and thus can be classified as a set of DCI formats through which the UL grant is transmitted, DL grant transmission DCI formats or a new set of DCI formats. Otherwise, the PDCCH formats can be classified into DCI formats 0, 1A, 1C, 3 and 3A which can be transmitted in a common search space and DCI formats 0, 1A, 1, 2A, 2, 1D, 1B, 2B, 2C and 4 which can be transmitted in a UE-specific search space.

The present invention is described focusing on grant based classification and it is assumed that all DCI formats are categorized into two sets for respectively transmitting the UL grant and DL grant. For example, DCI formats 3 and 3A through which TPC commands are transmitted are classified as set of DCI formats through which a UL grant is transmitted. However, the substance of the proposed method may be irrelevant to classification scheme and the proposed method is based on spatial multiplexing of each DCI format through multiple antennas instead of the above-described classification scheme. Accordingly, the proposed method can transmit the ePDCCH and/or bfPDCCH by transmitting DCI formats through multiple antennas irrespective of the above-mentioned classification scheme.

For transmission of DCI formats through multiple antennas, the following methods can be considered. The present invention proposes methods through which a BS transmits DCI formats through multiple antennas using spatial multiplexing. That is, a DCI format (DL/UL grant) being divided into streams is multiplexed and transmitted.

DCI formats according to purpose can be individually mapped per layer. Here, the purpose refers to whether a DCI format is used as a DL grant or a UL grant, refers to classification based on search space or refers to a DCI format number (e.g. DCI formats 0, 1, 1a, 1b, 1c, 2, etc.). While the present invention is described based on purpose classification according to whether a DCI format is used as a DL grant or a UL grant, other classification schemes are applicable to the present invention.

DCI formats 1, 1A, 1B, 1C, 1D, 2A, 2B and 2C through which a DL grant is transmitted, from among DCI formats, can be allocated to codeword 0 and DCI formats 0, 3, 3A and 4 through which a UL grant or uplink signal related information is transmitted can be allocated to codeword 1, or vice versa. Here, if the codewords have different bit sizes, the following scheme is applicable.

The bit sizes of codeword 0 and codeword 1 can be compared to each other and a codeword having a smaller bit size can be zero-padded or one-padded until the bits size of the codeword corresponds to the other codeword.

Figure 13:
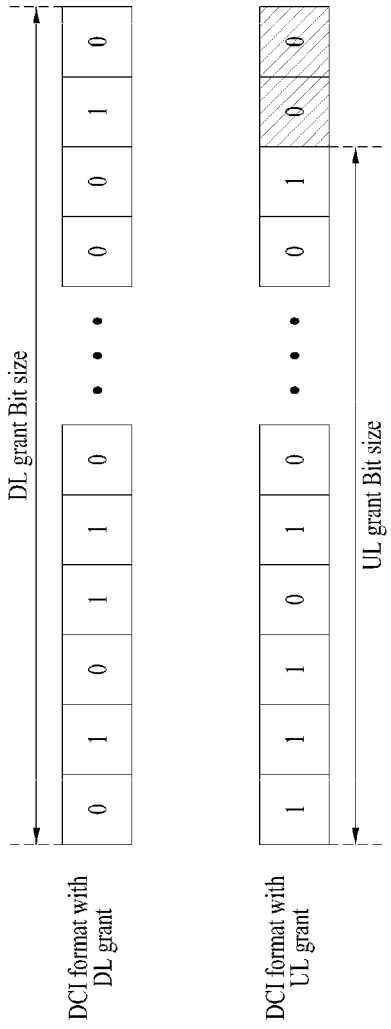
FIG. 13 illustrates a bit size matching method through zero padding.

FIG. 13 illustrates a bit size matching method through zero padding.

In FIG. 13, the bit size of a DCI format through which a DL grant is transmitted is greater than the bit size of a DCI format through which a UL grant is transmitted by 2 bits, and thus bit size matching is performed by padding the UL grant with two 0s.

The BS may transmit a DCI format without using spatial multiplexing (that is, applying multiplexing without discriminating between streams).

The BS can perform rate matching on bits obtained by channel-coding each codeword or change a channel coding rate and carry out bit size matching. Channel coding for PDCCH may be reused as a channel coding scheme, or channel coding for PDSCH or a new channel coding scheme may be used as the channel coding scheme. However, the present invention is not limited thereto. Here, rate matching includes not only puncturing, cyclic extension, repetition, 0/1 padding but also all procedures for adjusting bit size.

Figure 14A:
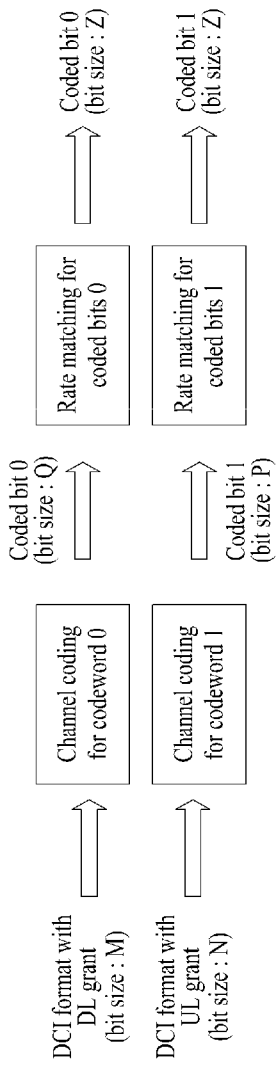
FIGS. 14a and 14b respectively illustrate a case in which transmitters share a channel coding block and a case in which the transmitters do not share the channel coding block.
Figure 14B:
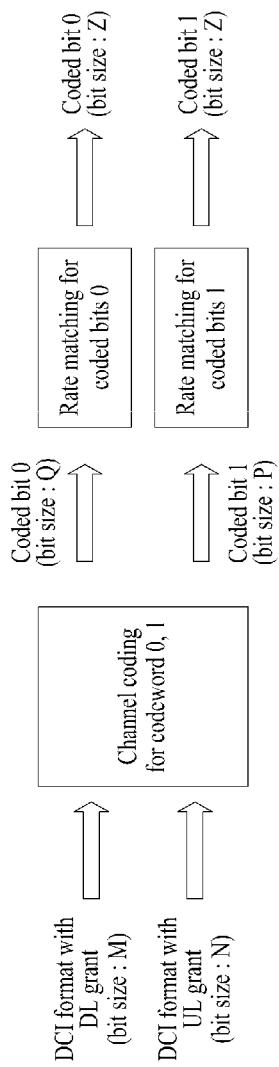

FIGS. 14a and 14b illustrate a case in which transmitters share a channel coding block and a case in which the transmitters do not share the channel coding block.

Referring to FIG. 14a, when DCI formats with DL grants are allocated to codeword 0, the bit size of codeword 0 is M, DCI formats with UL grants are allocated to codeword 1 and the bit size of codeword 1 is N, codeword 0 and codeword 1 respectively have Q bits and P bits after being subjected to channel coding and have the same bit size, that is, Z bits, after being subjected to rate matching. As shown in FIG. 14a, codeword 0 and codeword 1 are channel-coded through respective channel coding blocks.

FIG. 14b illustrates a case in which a channel coding block is shared. Referring to FIG. 14b, codewords 0 and 1 are channel-coded together, respectively have Q bits and P bits through channel coding and then have the same bit size, Z bits, through rate matching.

However, a transmitter can perform layer mapping instead of bit size matching. DCI formats that have not been subjected to bit size matching can be constellation-mapped into binary phase shift keying (BPSK) symbols, quadrature phase shift keying (QPSK) symbols, 16 quadrature amplitude modulation (QAM) symbols and 64 QAM symbols which can be layer mapped and transmitted.

Figure 15:
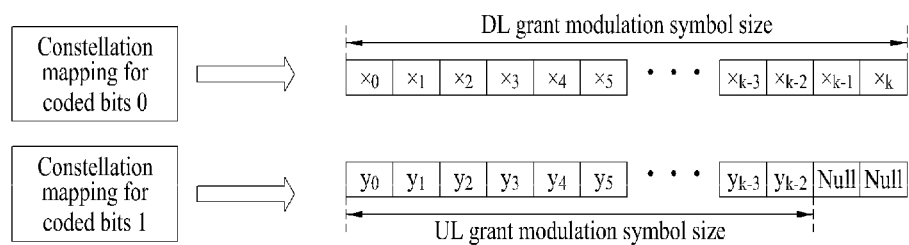
FIG. 15 illustrates a layer mapping method when DCI formats with DL grants configure coded bit 0, DCI formats with UL grants configure coded bit 1, and constellation mapped modulation symbols have a length k and a length k−2.

FIG. 15 illustrates a layer mapping method when DCI formats with DL grants constitute coded bit 0, DCI formats with UL grants constitute coded bit 1 and constellation-mapped modulation symbols have lengths k and k−2.

At a transmitter, a null symbol can be added to a short modulation symbol following the same for symbol size matching prior to layer mapping. Otherwise, a reference modulation symbol previously appointed between a transmitter (e.g. BS) and a receiver (e.g. UE) may be inserted into a modulation symbol. The null symbol can be represented as 0 corresponding to no signal or a value +1, −1, +j or −j. Otherwise, a predetermined point of a constellation used for a modulation symbol with a short length may be used as the null symbol.

DCI formats can be mapped to layers without being classified according to purpose.

The BS can perform joint channel coding and rate matching on DCI formats with DL grants and DCI formats with UL grants for a corresponding UE and then carry out layer mapping on the same. Here, joint channel coding refers to operation of sharing a channel coding block between DCI formats with DL grants and DCI formats with UL grants to constitute coded bits or operation of constituting coded bits using different channel coding blocks. Both two operations are applicable to the present invention.

As described above, the BS can perform rate matching on joint channel coded bits according to multi-antenna transmission mode in order to generate as many modulation symbols as an integer multiple of the number of layers. Here, rate matching can include puncturing, cyclic extension, repetition, 0/1 padding and any procedure for adjusting a bit size.

Figure 16A:
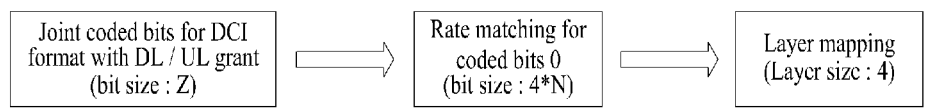
FIGS. 16a and 16b illustrate rate matching of coded bits to as many bits as an integer multiple of 4 when the number of layers is 4.
Figure 16B:
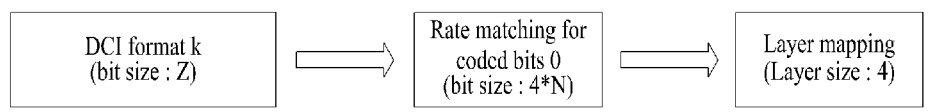

FIGS. 16a and 16b illustrate rate matching of coded bits to as many bits as an integer multiple of 4 when the number of layers is 4.

Referring to FIG. 16a, the BS can channel-code a DCI format (DL grant/UL grant), rate-match coded bits to as many bits as an integer multiple of 4 and perform layer mapping on the rate-matched bits. Here, the DCI format may be the existing DCI format or a DCI format newly defined to increase control channel capacity and the DCI format can be transmitted in a UE-specific search space without increasing the aggregation level thereof.

As described above, the BS can perform rate matching on channel-coded bits in order to generate as many modulation symbols as an integer multiple of the number of layers according to multi-antenna transmission mode. Here, rate matching can include puncturing, cyclic extension, repetition, 0/1 padding and any procedure for adjusting a bit size.

Referring to FIG. 16b, when a new DCI format k (e.g. k=5, 4a or 4b, which can be a combination of an integer that is not used for the existing DCI formats and a letter) is defined to increase control channel capacity or an existing DCI format is transmitted, a transmitter can rate-match coded bits to as many bits as an integer multiple (4×N) of 4 when the number of layers is 4.

Figure 17:
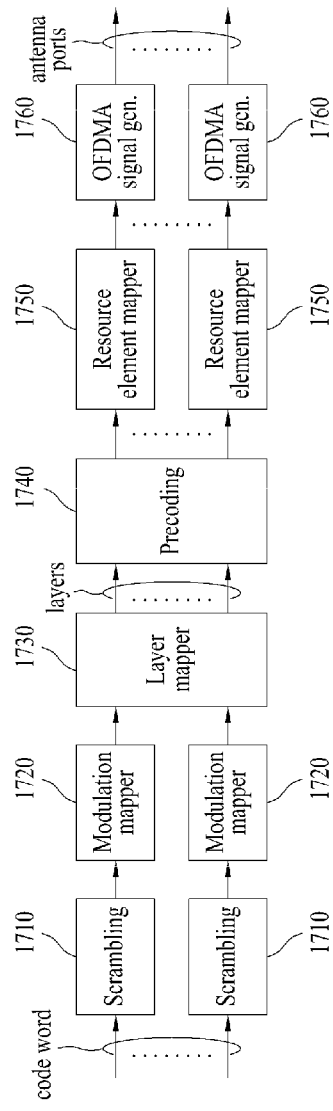
FIG. 17 illustrates a signal processing procedure through which a BS transmits a downlink signal.

FIG. 17 illustrates a signal processing procedure through which a BS transmits a downlink signal.

In 3GPP LTE, the BS can transmit one or more codewords on downlink. Accordingly, the one or more codewords can be processed into complex symbols through a scrambling module 17109 and a modulation mapper 1720 as on uplink. The complex symbols can be mapped to a plurality of layers through a layer mapper 1730 and each layer can be multiplied by a predetermined precoding matrix selected by a precoding module 1740 according to channel state and allocated to each transmit antenna. A transmission signal per antenna, processed as above, can be mapped to time-frequency resource elements to be used for transmission by a resource element mapper 1750, subjected to an OFDM signal generator 1760 and then transmitted through each antenna.

Specific DCI formats can refer to coded bits having bit sizes matched through channel coding and rate matching without classifying the purposes of the DCI formats. Codewords (coded bits) can be scrambled through a scrambling module 1710 for security or noise randomization. Scrambling can be performed according to $\tilde{b}^q(i)=(b^q(i)+c^q(i)) \mod 2$ (where $b^q(i)$ denotes coded bits, q denotes the number of codewords (the number of types of coded bits) and can be a value of 0 or 1, $c^q(i)$ represents a scrambling sequence and $\tilde{b}^q(i)$ represents scrambled bits). A polynomial for scrambling is generated based on Section 7.2 of 3GPP TS 36.211 v10.1.0 (2011-03) and $c_{init}=\lfloor n_s/2 \rfloor 2^9 + N_{ID}^{cell}$ used to generate a PDCCH or $c_{init}=n_{RNTI} \cdot 2^{14} + q \cdot 2^{13} + \lfloor n_s/2 \rfloor \cdot 2^9 + N_{ID}^{cell}$ used to generate a PDSCH can be used as an initial value. Otherwise, a new cell-specific or UE-specific initial value may be used. The scrambled bits can be modulated and transmitted to the layer mapper 1730. The layer mapper 1730 can be configured based on the number of codewords and the number of layers according to Table 4. Here, $d^{(o)}(i)$ denotes a modulated symbol, $x^{(o)}(i)$ represents a result obtained by passing the modulated symbol through the layer mapper 1730, $M_{symb}^{(0)}$ and $M_{symb}^{(1)}$ respectively denote the numbers of demodulated symbols obtained from codewords 0 and $M_{symb}^{layer}$ denote the number of modulated symbols generated per layer.

TABLE 4

| Number of layers | Number of codewords | Codeword-to-layer mapping $i = 0, 1, \ldots, M_{symb}^{layer} - 1$ | |
| --- | --- | --- | --- |
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$<br>$x^{(1)}(i) = d^{(0)}(2i + 1)$ | $M_{symb}^{layer} = M_{symb}^{(0)}/2$ |

TABLE 4-continued

| Number of layers | Number of codewords | Codeword-to-layer mapping $i = 0, 1, \ldots, M_{symb}^{layer} - 1$ | |
|---|---|---|---|
| 2 | 2 | $x^{(0)}(i) = d^{(0)}(i)$<br>$x^{(1)}(i) = d^{(1)}(i)$ | $M_{symb}^{layer} = M_{symb}^{(0)} = M_{symb}^{(1)}$ |
| 3 | 1 | $x^{(0)}(i) = d^{(0)}(3i)$<br>$x^{(1)}(i) = d^{(0)}(3i + 1)$<br>$x^{(2)}(i) = d^{(0)}(3i + 2)$ | $M_{symb}^{layer} = M_{symb}^{(0)}/3$ |
| 3 | 2 | $x^{(0)}(i) = d^{(0)}(i)$<br>$x^{(1)}(i) = d^{(1)}(2i)$<br>$x^{(2)}(i) = d^{(1)}(2i + 1)$ | $M_{symb}^{layer} = M_{symb}^{(0)} = M_{symb}^{(1)}/2$ |
| 4 | 1 | $x^{(0)}(i) = d^{(0)}(4i)$<br>$x^{(1)}(i) = d^{(0)}(4i + 1)$<br>$x^{(2)}(i) = d^{(0)}(4i + 2)$<br>$x^{(3)}(i) = d^{(0)}(4i + 3)$ | $M_{symb}^{layer} = M_{symb}^{(0)}/4$ |
| 4 | 2 | $x^{(0)}(i) = d^{(0)}(2i)$<br>$x^{(1)}(i) = d^{(0)}(2i + 1)$<br>$x^{(2)}(i) = d^{(1)}(2i)$<br>$x^{(3)}(i) = d^{(1)}(2i + 1)$ | $M_{symb}^{layer} = M_{symb}^{(0)}/2 = M_{symb}^{(1)}/2$ |
| 5 | 2 | $x^{(0)}(i) = d^{(0)}(2i)$<br>$x^{(1)}(i) = d^{(0)}(2i + 1)$<br>$x^{(2)}(i) = d^{(1)}(3i)$<br>$x^{(3)}(i) = d^{(1)}(3i + 1)$<br>$x^{(4)}(i) = d^{(1)}(3i + 2)$ | $M_{symb}^{layer} = M_{symb}^{(0)}/2 = M_{symb}^{(1)}/3$ |
| 6 | 2 | $x^{(0)}(i) = d^{(0)}(3i)$<br>$x^{(1)}(i) = d^{(0)}(3i + 1)$<br>$x^{(2)}(i) = d^{(0)}(3i + 2)$<br>$x^{(3)}(i) = d^{(1)}(3i)$<br>$x^{(4)}(i) = d^{(1)}(3i + 1)$<br>$x^{(5)}(i) = d^{(1)}(3i + 2)$ | $M_{symb}^{layer} = M_{symb}^{(0)}/3 = M_{symb}^{(1)}/3$ |
| 7 | 2 | $x^{(0)}(i) = d^{(0)}(3i)$<br>$x^{(1)}(i) = d^{(0)}(3i + 1)$<br>$x^{(2)}(i) = d^{(0)}(3i + 2)$<br>$x^{(3)}(i) = d^{(1)}(4i)$<br>$x^{(4)}(i) = d^{(1)}(4i + 1)$<br>$x^{(5)}(i) = d^{(1)}(4i + 2)$<br>$x^{(6)}(i) = d^{(1)}(4i + 3)$ | $M_{symb}^{layer} = M_{symb}^{(0)}/3 = M_{symb}^{(1)}/4$ |
| 8 | 2 | $x^{(0)}(i) = d^{(0)}(4i)$<br>$x^{(1)}(i) = d^{(0)}(4i + 1)$<br>$x^{(2)}(i) = d^{(0)}(4i + 2)$<br>$x^{(3)}(i) = d^{(0)}(4i + 3)$<br>$x^{(4)}(i) = d^{(1)}(4i)$<br>$x^{(5)}(i) = d^{(1)}(4i + 1)$<br>$x^{(6)}(i) = d^{(1)}(4i + 2)$<br>$x^{(7)}(i) = d^{(1)}(4i + 3)$ | $M_{symb}^{layer} = M_{symb}^{(0)}/4 = M_{symb}^{(1)}/4$ |

When one codeword is configured, layer mapping may be performed using Table 5 to obtain spatial diversity.

TABLE 5

| Number of layers | Number of codewords | Codeword-to-layer mapping $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$<br>$x^{(1)}(i) = d^{(0)}(2i + 1)$ | $M_{symb}^{layer} = M_{symb}^{(0)}/2$ |
| 2 | 2 | $x^{(0)}(i) = d^{(0)}(i)$<br>$x^{(1)}(i) = d^{(1)}(i)$ | $M_{symb}^{layer} = M_{symb}^{(0)} = M_{symb}^{(1)}$ |

Figure 18:
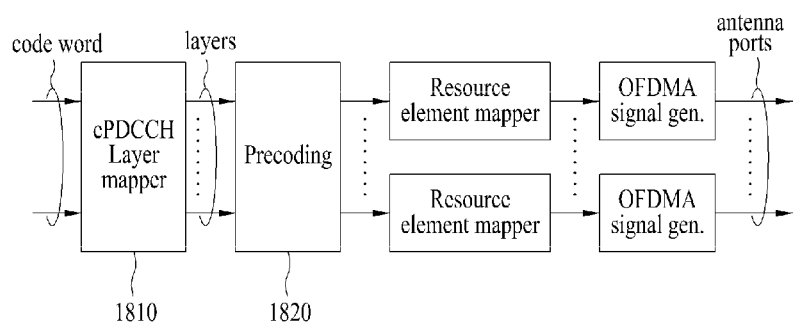
FIG. 18 illustrates a signal processing procedure through which a BS transmits an ePDCCH or a bfPDCCH in LTE-A.

FIG. 18 illustrates a signal processing procedure through which a BS transmits an ePDCCH or bfPDCCH in LTE-A.

Referring to FIG. 18, bit or symbol size matched modulation symbols can be transmitted to multiple antennas through a layer mapper 1810 and a precoding module 1820. In FIG. 18, codewords may refer to bit size matched coded bits generated from DCI formats discriminated by purposes through channel coding and rate matching.

The bit or symbol size matched modulation symbols can be transmitted to multiple antennas through the ePDCCH layer mapper 1810 and the precoding module 1820. In FIG. 18, codewords may refer to one or more modulated symbols of bit size matched coded bits which are obtained by channel coding and rate matching DCI formats discriminated according to usage. Otherwise, the codewords may refer to one or more modulated symbols of bit size matched coded bits generated by channel coding and rate matching specific DCI formats irrespective of the usage.

The codewords (modulated symbols) are transmitted to the layer mapper 1810. The layer mapper 1810 can be configured based on the number of codewords and the number of layers according to Table 4 or Table 5. In Tables 4 and 5, $d^{(0)}(i)$ denotes a modulated symbol, $x^{(0)}(i)$ represents a result obtained by passing the modulated symbol through the layer mapper 1810, $M_{symb}^{(0)}$ and $M_{symb}^{(1)}$ respectively denote the numbers of demodulated symbols obtained from codewords 0 and $M_{symb}^{layer}$ denote the number of modulated symbols generated per layer.

While the number of layers proposed by the present invention, which can be used for the ePDCCH and bfPDCCH, is 1 to 8, a maximum number of layers, which can be used to solve reliability problems caused by physical antenna characteristics and RF chain (or RF module) characteristics for multiple antenna transmission, can be fixed to 2 or 4. However, the present invention is not limited thereto.

As described above, CRS based precoding can be used for the modulated symbols generated through the layer mapper 1810. Precoding is performed through a procedure which will be described hereinafter. P denotes a total number of layers and v denotes a total number of antennas. An antenna port refers to a virtual antenna through which a layered modulated symbol is transmitted in a logical sense rather than a physical antenna used for actual transmission. Accordingly, the antenna port may be mapped to a physical antenna or mapped using a different mapping rule. Precoding can be performed based on Section 6.3 of 3GPP TS 36.211 v10.1.0 (2011-03). Equation 1 defines precoding for spatial multiplexing.

TABLE 6

| Codebook index | Number of layers υ | |
|---|---|---|
| | 1 | 2 |
| 0 | $\frac{1}{\sqrt{2}}\begin{bmatrix} 1 \\ 1 \end{bmatrix}$ | $\frac{1}{\sqrt{2}}\begin{bmatrix} 1 & 0 \\ 0 & 1 \end{bmatrix}$ |
| 1 | $\frac{1}{\sqrt{2}}\begin{bmatrix} 1 \\ -1 \end{bmatrix}$ | $\frac{1}{2}\begin{bmatrix} 1 & 1 \\ 1 & -1 \end{bmatrix}$ |
| 2 | $\frac{1}{\sqrt{2}}\begin{bmatrix} 1 \\ j \end{bmatrix}$ | $\frac{1}{2}\begin{bmatrix} 1 & 1 \\ j & -j \end{bmatrix}$ |
| 3 | $\frac{1}{\sqrt{2}}\begin{bmatrix} 1 \\ -j \end{bmatrix}$ | — |

Table 7 is a codebook for transmission at antenna ports 0, 1, 2 and 3.

TABLE 7

| Codebook index | $u_n$ | Number of layers v | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

$$\begin{bmatrix} y^{(0)}(i) \\ \vdots \\ y^{(P-1)}(i) \end{bmatrix} = W(i) \begin{bmatrix} x^{(0)}(i) \\ \vdots \\ x^{(\upsilon-1)}(i) \end{bmatrix} \quad \text{[Equation 1]}$$

Here, W(i) has a size of P×v, i=0, 1, . . . , $M_{symb}^{ap}-1$, $M_{symb}^{ap}=M_{symb}^{layer}$. W(i) is selected from precoding elements in a codebook configured in the BS and UE for spatial multiplexing. The BS can limit precoder selection in the UE to subsets of elements in the codebook using codebook subset restrictions. The codebook configured in the BS and UE may be as shown in Table 6.

Transmission can be performed using a precoding matrix described in 6.3.3.3 of 3GPP TS 36.211 v10.1.0 (2011-03) when spatial diversity is used. i=0, 1, . . . , $M_{symb}^{ap}-1$ in precoding calculation can be defined according to Equation 2.

$$\begin{bmatrix} y^{(0)}(2i) \\ y^{(1)}(2i) \\ y^{(0)}(2i+1) \\ y^{(1)}(2i+1) \end{bmatrix} = \frac{1}{\sqrt{2}} \begin{bmatrix} 1 & 0 & j & 0 \\ 0 & -1 & 0 & j \\ 0 & 1 & 0 & j \\ 1 & 0 & -j & 0 \end{bmatrix} \begin{bmatrix} \text{Re}(x^{(0)}(i)) \\ \text{Re}(x^{(1)}(i)) \\ \text{Im}(x^{(0)}(i)) \\ \text{Im}(x^{(1)}(i)) \end{bmatrix} \quad \text{[Equation 2]}$$

for $i = 0, 1, \ldots, M_{symb}^{layer}-1$ with $M_{symb}^{ap} = 2M_{symb}^{layer}$ For transmission at two antenna ports p∈{0,1}, y(i)=[$y^{(0)}(i)$ $y^{(1)}(i)$]$^T$ is output.

For transmission at two antenna ports p∈{0,1, 3}, y(i)= [$y^{(0)}(i)$ $y^{(1)}(i)$ $y^{(2)}(i)$ $y^{(3)}(i)$]$^T$ is output and i=0, 1, . . . , $M_{symb}^{ap}-1$ in precoding operation can be defined by Equation 3.

[Equation 3]

$$\begin{bmatrix} y^{(0)}(4i) \\ y^{(1)}(4i) \\ y^{(2)}(4i) \\ y^{(3)}(4i) \\ y^{(0)}(4i+1) \\ y^{(1)}(4i+1) \\ y^{(2)}(4i+1) \\ y^{(3)}(4i+1) \\ y^{(0)}(4i+2) \\ y^{(1)}(4i+2) \\ y^{(2)}(4i+2) \\ y^{(3)}(4i+2) \\ y^{(0)}(4i+3) \\ y^{(1)}(4i+3) \\ y^{(2)}(4i+3) \\ y^{(3)}(4i+3) \end{bmatrix} = \frac{1}{\sqrt{2}} \begin{bmatrix} 1 & 0 & 0 & 0 & j & 0 & 0 & 0 \\ 0 & 0 & 0 & 0 & 0 & 0 & 0 & 0 \\ 0 & -1 & 0 & 0 & 0 & j & 0 & 0 \\ 0 & 0 & 0 & 0 & 0 & 0 & 0 & 0 \\ 0 & 1 & 0 & 0 & 0 & j & 0 & 0 \\ 0 & 0 & 0 & 0 & 0 & 0 & 0 & 0 \\ 1 & 0 & 0 & 0 & -j & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 1 & 0 & 0 & 0 & j & 0 \\ 0 & 0 & 0 & 0 & 0 & 0 & 0 & 0 \\ 0 & 0 & 0 & -1 & 0 & 0 & 0 & j \\ 0 & 0 & 0 & 0 & 0 & 0 & 0 & 0 \\ 0 & 0 & 0 & 1 & 0 & 0 & 0 & j \\ 0 & 0 & 0 & 0 & 0 & 0 & 0 & 0 \\ 0 & 0 & 1 & 0 & 0 & 0 & -j & 0 \end{bmatrix} \begin{bmatrix} \mathrm{Re}(x^{(0)}(i)) \\ \mathrm{Re}(x^{(1)}(i)) \\ \mathrm{Re}(x^{(2)}(i)) \\ \mathrm{Re}(x^{(3)}(i)) \\ \mathrm{Im}(x^{(0)}(i)) \\ \mathrm{Im}(x^{(1)}(i)) \\ \mathrm{Im}(x^{(2)}(i)) \\ \mathrm{Im}(x^{(3)}(i)) \end{bmatrix}$$

for $i = 0, 1, \ldots, M_{symb}^{layer} - 1$ with $M_{symb}^{ap} = \begin{cases} 4M_{symb}^{layer} & \text{if } M_{symb}^{(0)} \bmod 4 = 0 \\ (4M_{symb}^{layer}) - 2 & \text{if } M_{symb}^{(0)} \bmod 4 \neq 0 \end{cases}$ When precoding based on DM RS instead of CRS is used, the UE can receive the ePDCCH and/or bfPDCCH without information on a precoding matrix index using a DM RS generated according to 6.10.3 of 3GPP TS 36.211 v10.1.0 (1022-03). That is, the UE can estimate an equivalent channel matrix obtained by multiplying a channel matrix (corresponding to a radio channel that transmitted signals have suffered) because the DM RS is multiplied by a precoding matrix and transmitted, differently from the CRS, and receive the ePDCCH without information on the precoding matrix. In LTE-A, the BS can transmit a CRS based ePDCCH and/or bfPDCCH in transmission mode 7. For application of the transmit diversity scheme, CRS based transmission is needed. The BS can transmit a DM RS based ePDCCH and/or bfPDCCH in transmission mode 9.

If the BS transmits a CRS based ePDCCH and/or bfPDCCH instead of DM RS based ePDCCH and/or bfPDCCH, the BS needs to inform the UE of information on a precoding matrix applied to transmission. In this case, a legacy zone may be specially reused as a region for transmitting PDCCH. On the assumption that the ePDCCH is explicitly transmitted based on scheduling using a DL grant of a PDCCH, the BS can indicate the ePDCCH for the UE using a precoding information field in a DCI format. However, since blind decoding based ePDCCH and/or bfPDCCH transmission can be performed only when the corresponding UE can receive the ePDCCH and/or bfPDCCH without receiving a DCI format of a PDCCH (or the ePDCCH and/or bfPDCCH is transmitted when the UE cannot receive the PDCCH due to interference), information on the precoding matrix needs to be implicitly signaled or implicitly transmitted to the UE.

The present invention proposes a method through which the UE can implicitly acquire precoding matrix information regarding a CRS based precoded ePDCCH and/or bfPDCCH.

The BS can precode the ePDCCH or bfPDCCH using a precoding matrix used in the most recent PDSCH from among PDSCHs transmitted for the UE or a PDCCH and transmit the precoded ePDCCH or bfPDCCH. Accordingly, the UE can acquire a precoding matrix index through a precoding information field in a most recently obtained DCI format, perform deprecoding based on the acquired precoding matrix information, decode the ePDCCH and/or bfPDCCH and then acquire DCI formats transmitted thereto.

Alternatively, the BS can transmit precoding matrix information used for ePDCCH or bfPDCCH transmission to the UE using RRC signaling or a MAC message. However, the method of transmitting precoding matrix information using RRC signaling or a MAC message cannot reflect instantaneous channel state and thus the precoding matrix information can be long term based precoding matrix information. This scheme can be applied to a UE in a fixed position because channel state is not considerably changed in the fixed UE.

As described above, the present invention proposes the ePDCCH and bfPDCCH for increasing reliability of the PDCCH and a procedure for transmitting the same through multiple antennas. The proposed method can improve cell deployment and throughput by providing a PDCCH with high reliability to each UE and require a low SNR for a UE to receive a PDCCH so as to reduce complexity in UE implementation.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The method and apparatus for transmitting and receiving control information in a wireless communication system is industrially applicable to various communication systems such as 3GPP LTE, LTE-A, IEEE 802, etc.

The invention claimed is:

1. A method for transmitting control information by a base station to a number of user equipment (UE) in a wireless communication system, the method comprising:
    precoding control information by applying different precoding matrix indices to the control information per each UE from among predetermined precoding matrices; and
    transmitting, to each UE through a beamformed Physical Downlink Control CHannel (bfPDCCH), the precoded control information to which the different precoding matrix indices are applied for each UE,
    wherein the control information is multiplexed and transmitted via a plurality of antennas, and
    wherein the precoding matrix indices applied to the control information are implicitly signaled to each UE for blinding decoding of the precoded control information by using a previous Physical Downlink Shared CHannel (PDSCH) transmission.

2. The method according to claim 1, wherein the control information corresponds to a downlink control information (DCI) format.

3. The method according to claim 1, further comprising categorizing the control information per UE according to whether the control information is a downlink (DL) grant or a uplink (UL) grant or whether the control information is transmitted through a common search space or a UE-specific search space, and mapping the categorized control information to a layer.

4. The method according to claim 1, wherein the control information per UE is transmitted based on a cell-specific reference signal (CRS) or a demodulation reference signal (DM RS).

5. The method according to claim 1, wherein the precoding matrix applied to the control information for the each UE is implicitly signaled when the control information per UE is transmitted based on the CRS.

6. The method according to claim 1, wherein the control information per UE is frequency-multiplexed in a physical downlink shared channel (PDSCH) region and transmitted.

7. A method for receiving control information by a user equipment (UE) in a wireless communication system, the method comprising:
    receiving, from a base station through a beamformed Physical Downlink Control CHannel (bfPDCCH), precoded control information to which a precoding matrix index discriminated from a precoding matrix index applied to another UE from among predetermined precoding matrices is applied; and
    blind decoding the precoded control information,
    wherein the control information is multiplexed and transmitted via a plurality of antennas, and
    wherein the precoding matrix index applied to the precoded control information is implicitly signaled to the UE for the blinding decoding of the precoded control information by using a previous Physical Downlink Shared CHannel (PDSCH) transmission from the base station.

8. The method according to claim 7, wherein the control information is transmitted based on a cell-specific reference signal (CRS) or a demodulation reference signal (DM RS).

9. The method according to claim 8, wherein the precoding matrix index applied to the precoding control information is implicitly signaled when the control information is transmitted based on the CRS.

10. The method according to claim 9, further comprising:
    determining the precoding matrix index by using the previous Physical Downlink Shared CHannel (PDSCH) transmission from the base station.

11. A base station for transmitting control information to a number of user equipment (UE) in a wireless communication system, comprising:
    a processor configured to precode control information by applying different precoding matrix indices to the control information per UE from among predetermined precoding matrices; and
    a transmitter configured to transmit, to each UE through a beamformed Physical Downlink Control CHannel (bfPDCCH), the precoded control information to which the different precoding matrix indices are applied for each UE,
    wherein the control information is multiplexed and transmitted via a plurality of antennas, and
    wherein the precoding matrix indices applied to the control information are implicitly signaled to each UE for blinding decoding of the precoded control information by using a previous Physical Downlink Shared CHannel (PDSCH) transmission.

12. A user equipment (UE) for receiving control information in a wireless communication system, comprising:
    a receiver configured to receive, from a base station through a beamformed Physical Downlink Control CHannel (bfPDCCH), precoded control information to which a precoding matrix index discriminated from a precoding matrix index applied to another UE from among predetermined precoding matrices is applied; and
    a processor configured to blind decode the precoded control information,
    wherein the control information is multiplexed and transmitted via a plurality of antennas, and
    wherein the precoding matrix index applied to the precoded control information is implicitly signaled to the UE for the blinding decoding of the precoded control information by using a previous Physical Downlink Shared CHannel (PDSCH) transmission from the base station.

* * * * *